US011012956B2

(12) United States Patent
Tooher et al.

(10) Patent No.: US 11,012,956 B2
(45) Date of Patent: May 18, 2021

(54) METHODS FOR FLEXIBLE RESOURCE USAGE

(71) Applicant: IDAC HOLDINGS, INC., Wilmington, DE (US)

(72) Inventors: J. Patrick Tooher, Montreal (CA); Paul Marinier, Brossard (CA); Martino M. Freda, Laval (CA); Ghyslain Pelletier, Montreal (CA)

(73) Assignee: IDAC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/324,446

(22) PCT Filed: Aug. 9, 2017

(86) PCT No.: PCT/US2017/046105
§ 371 (c)(1),
(2) Date: Feb. 8, 2019

(87) PCT Pub. No.: WO2018/031664
PCT Pub. Date: Feb. 15, 2018

(65) Prior Publication Data
US 2019/0208482 A1 Jul. 4, 2019

Related U.S. Application Data

(60) Provisional application No. 62/373,089, filed on Aug. 10, 2016, provisional application No. 62/400,950, filed on Sep. 28, 2016.

(51) Int. Cl.
*H04W 56/00* (2009.01)
*H04L 27/26* (2006.01)
(Continued)

(52) U.S. Cl.
CPC .......... *H04W 56/001* (2013.01); *H04L 5/005* (2013.01); *H04L 5/0055* (2013.01);
(Continued)

(58) Field of Classification Search
CPC combination set(s) only.
See application file for complete search history.

(56) References Cited

U.S. PATENT DOCUMENTS 10,285,146 B2   5/2019   Urabayashi et al.
10,728,852 B2 * 7/2020   Zhang ............... H04W 52/0232
(Continued)

FOREIGN PATENT DOCUMENTS

WO        09062115 A2      5/2009
WO      2015000917 A2      1/2015
(Continued)

OTHER PUBLICATIONS

Ericsson et al., "Activation/deactivation of bandwidth part," 3GPP TSG RAN1 NR Ad-Hoc#2, R1-1711853, Qingdao, P.R. China (Jun. 27-30, 2017).
(Continued)

*Primary Examiner* — Xavier S Wong
(74) *Attorney, Agent, or Firm* — Volpe Koenig

(57) ABSTRACT

A method and system for flexible resource control for a wireless transmit/receive unit (WTRU) is disclosed. The WTRU may monitor a first control channel region and receive a first control channel transmission in the first control region indicating boundaries of a plurality of numerology blocks of a carrier. The WTRU may then receive a second control channel transmission in a second control channel of a second control region, wherein the second control channel transmission indicates one or more numerology parameters for at least one of the plurality of numerology blocks. The WTRU may then transmit or receive data
(Continued)

based on the one or more numerology parameters of the one or more numerology blocks.

12 Claims, 14 Drawing Sheets

(51) Int. Cl.
*H04W 24/08* (2009.01)
*H04L 5/00* (2006.01)
(52) U.S. Cl.
CPC .......... *H04L 5/0092* (2013.01); *H04L 5/0094* (2013.01); *H04L 27/2607* (2013.01); *H04L 27/2628* (2013.01); *H04W 24/08* (2013.01); *H04L 5/0053* (2013.01)

(56) References Cited

U.S. PATENT DOCUMENTS

| | | | |
|---|---|---|---|
| 10,868,643 B2* | 12/2020 | Boudreau | H04L 27/2666 |
| 2014/0086173 A1 | 3/2014 | Sadeghi et al. | |
| 2016/0029331 A1 | 1/2016 | Seo et al. | |
| 2017/0279522 A1* | 9/2017 | Yi | H04L 67/42 |
| 2017/0318598 A1* | 11/2017 | Islam | H04W 74/08 |
| 2017/0359791 A1* | 12/2017 | Onggosanusi | H04L 5/0023 |
| 2018/0048511 A1* | 2/2018 | Hakola | H04L 5/0048 |
| 2018/0279388 A1* | 9/2018 | Miao | H04W 76/10 |
| 2018/0376439 A1 | 12/2018 | Urabayashi et al. | |
| 2019/0052503 A1 | 2/2019 | Takahashi et al. | |
| 2019/0149384 A1 | 5/2019 | Kim et al. | |
| 2019/0208481 A1 | 7/2019 | Tang | |
| 2019/0230696 A1* | 7/2019 | Kim | H04W 74/0833 |
| 2020/0177356 A1* | 6/2020 | Kim | H04L 5/0048 |
| 2020/0214049 A1* | 7/2020 | Deenoo | H04W 76/28 |

FOREIGN PATENT DOCUMENTS

| | | |
|---|---|---|
| WO | 2015172098 A1 | 11/2015 |
| WO | 2017/035305 | 3/2017 |
| WO | 2017/156224 | 9/2017 |

OTHER PUBLICATIONS

Ericsson et al., "Way Forward on bandwidth part for efficient wideband operation in NR," 3GPP TSG-RAN WG1 #89, R1-17xxxxx (R1-1709802), Hangzhou, P.R. China (May 15-19, 2017).
Huawei et al., "Discussion on frame structure for NR," 3GPP TSG RAN WG1 Meeting #85, R1-164032, Nanjing, China (May 23-27, 2016).
Huawei et al., "WF on bandwidth part," 3GPP TSG RAN WG1 Meeting #88bis, R1-1706582, Spokane, USA (Apr. 3-7, 2017).
Huawei et al., "WF on resource allocation for data transmission," 3GPP TSG RAN WG1 Meeting #88, R1-1703781, Athens, Greece (Feb. 13-17, 2017).
Intel Corporation, "Overview of new radio access technology requirements and designs," 3GPP TSG RAN WG1 Meeting #84bis, R1-162379, Busan, Korea (Apr. 11-15, 2016).
Intel et al., "Way forward on further details of bandwidth part operation," 3GPP TSG-RAN WG1 Ad-Hoc #2, R1-1711788, Qingdao, P.R. China (Jun. 27-30, 2017).
Intel et al., "Way forward on PRB indexing," 3GPP TSG-RAN WG1 Ad-Hoc #2, R1-1711855, Qingdao, P.R. China (Jun. 27-30, 2017).
Interdigital Communications, "A Framework for Initial Access for NR," 3GPP TSG-RAN WG1 #86bis, R1-1610351, Lisbon, Portugal, (Oct. 10-14, 2016).
Interdigital Communications, "Control Plane Functions and transport mechanism for Interworking between NR and LTE," 3GPP TSG-RAN WG2 #95bis, R2-166856, Kaohsiung, Taiwan (Oct. 10-14, 2016).
Interdigital Communications, "DL control channel framework for NR," 3GPP TSG-RAN WG1 #86bis, R1-1610089, Lisbon, Portugal, (Oct. 10-14, 2016).
Interdigital Communications, "Forward compatible control channel framework for NR," 3GPP TSG-RAN WG1 #86, R1-167327, Göteborg, Sweden (Aug. 22-26, 2016).
Interdigital Communications, "UE Support for Multiple Numerologies for NR," 3GPP TSG-RAN WG1 #86bis, R1-1610022, Lisbon, Portugal, (Oct. 10-14, 2016).
Interdigital Communications, "UE Support for Multiple Numerologies with NR," 3GPP TSG-RAN WG1 #86, R1-167328, Göteborg, Sweden (Aug. 22-26, 2016).
Interdigital Communications, "UE Support for Multiple Numerologies with NR," 3GPP TSG-RAN WG1 #86, R1-165055, Göteborg, Sweden (Aug. 22-26, 2016).
Interdigital, "DL data scheduling," 3GPP TSG RAN WG1 Meeting #89, R1-1709010, Hangzhou, P.R. China (May 15-19, 2017).
Interdigital, Inc., "On frequency-domain resource allocation for NR," 3GPP TSG RAN WG1 NR Ad-Hoc#2, R1-1710953, Qingdao, P.R. China (Jun. 27-30, 2017).
LG Electronics et al., "WF on configuration of a BWP in wider bandwidth operation," 3GPP TSG RAN1 NR Ad-Hoc#2, R1-1711812, Qingdao, P.R. China (Jun. 27-30, 2017).
Mediatek et al., "Way Forward on bandwidth part in NR," 3GPP TSG-RAN WG1 #88bis, R1-1706745, Spokane, USA (Apr. 3-7, 2017).
Mediatek et al., "Way Forward on Bandwidth Part Operation," 3GPP TSG-RAN WG1 Meeting #90, R1-1715307, Prague, Czech Republic (Aug. 21-25, 2017).
Mediatek et al., "Way Forward on Further Details for Bandwidth Part," 3GPP TSG-RAN WG1 NR Ad-Hoc Meeting, R1-1711802, Qingdao, P.R. China (Jun. 27-30, 2017).
Mitsubishi Electric, "Performance comparison of nonlinear precoding schemes for NR MU-MIMO," 3GPP TSG-RAN WG1 #86bis, R1-1610229, Lisbon, Portugal (Oct. 10-14, 2016).
NTT Docomo et al., "Way forward on RBG size," 3GPP TSG RAN WG1 Meeting #89, R1-1709740, Hangzhou, P.R. China (May 15-19, 2017).
Oppo et al., "Outputs of offline discussion on RBG size/number determination," 3GPP TSG RAN WG1 NR Ad-Hoc#2, R1-1711843, Qingdao, P.R. China (Jun. 27-30, 2017).
Oppo et al., "WF on bandwidth part configuration," 3GPP TSG RAN WG1 Meeting #89, R1-1709519, Hangzhou, P.R. China (May 15-19, 2017).
Third Generation Partnership Project, "Technical Specification Group Radio Access Network; Evolved Universal Terrestrial Radio Access (E-UTRA); Physical layer proceduresl(Release 13)," 3GPP TS 36.213 V13.2.0 (Jun. 2016).
Third Generation Partnership Project, "Technical Specification Group Radio Access Network; Evolved Universal Terrestrial Radio Access (E-UTRA); Physical layer procedures (Release 13)," 3GPP TS 36.213 V13.6.0 (Jun. 2017).
Third Generation Partnership Project, "Technical Specification Group Radio Access Network; Evolved Universal Terrestrial Radio Access (E-UTRA); Physical layer procedures-(Release 14)," 3GPP TS 36.213 V14.3.0 (Jun. 2017).
Third Generation Partnership Project, "Technical Specification Group Radio Access Network; Evolved Universal Terrestrial Radio Access (E-UTRA); User Equiement (UE) radio transmission and receptien (Release 14)," 3GPP TS 36.101 V14.0.0 (Jun. 2016).
Third Generation Partnership Project, "Technical Specification Group Radio Access Network; Evolved Universal Terrestrial Radio Access (E-UTRA); User Equiement (UE) radio transmission and receptien (Release 14)," 3GPP TS 36.101 V14.4.0 (Jun. 2017).
Third Generation Partnership Project, Technical Specification Group Radio Access Network; Evolved Universal Terrestrial Radio Access (E-UTRA) and Evolved Universal Terrestrial Radio Access Network (E-UTRAN); Overall description; Stage 2 (Release 13)3GPP TS 36.300 V13.4.0 (Jun. 2016).
Third Generation Partnership Project, "Technical Specification Group Radio Access Network; Evolved Universal Terrestrial Radio Access (E-UTRA); Physical channels and modulation (Release 13)," 3GPP TS 36.211 V13.6.0 (Jun. 2017).

(56) References Cited

OTHER PUBLICATIONS

Third Generation Partnership Project, "Technical Specification Group Radio Access Network; Evolved Universal Terrestrial Radio Access (E-UTRA); Physical channels and modulation (Release 14)," 3GPP TS 36.211 V14.3.0 (Jun. 2017).

Third Generation Partnership Project, "Technical Specification Group Radio Access Network; Evolved Universal Terrestrial Radio Access (E-UTRA); Multiplexing and channel coding (Release 13)," 3GPP TS 36.212 V13.6.0 (Jun. 2017).

Third Generation Partnership Project, "Technical Specification Group Radio Access Network; Evolved Universal Terrestrial Radio Access (E-UTRA); Multiplexing and channel coding (Release 14)," 3GPP TS 36.212 V14.3.0 (Jun. 2017).

Third Generation Partnership Project, "Technical Specification Group Radio Access Network; Evolved Universal Terrestrial Radio Access (E-UTRA); Physical layer; Measurements (Release 13)," 3GPP TS 36.214 V13.4.0 (Dec. 2016).

Third Generation Partnership Project, "Technical Specification Group Radio Access Network; Evolved Universal Terrestrial Radio Access (E-UTRA); Physical layer; Measurements (Release 14)," 3GPP TS 36.214 V14.2.0 (Mar. 2017).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.8.0 (Jun. 2017).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.3.0 (Jun. 2017).

Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.6.0 (Jun. 2017).

Third Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.3.0 (Jun. 2017).

Third Generation Partnership Project, "Technical Specification Group Radio Access Network; Evolved Universal Terrestrial Radio Access (E-UTRA); Multiplexing and channel coding (Release 13)," 3GPP TS 36.212 V13.2.0 (Jun. 2016).

Third Generation Partnership Project, "Technical Specification Group Radio Access Network; Evolved Universal Terrestrial Radio Access (E-UTRA); Physical layer; Measurements (Release 13)," 3GPP TS 36.214 V13.2.0 (Jun. 2016).

Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.2.0 (Jun. 2016).

Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.2.0 (Jun. 2016).

Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.6.1 (Jul. 2017).

Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.3.0 (Jun. 2017).

Third Generation Partnership Project, "Technical Specification Group Radio Access Network; NR; Physical channels and modulation (Release 15)," 3GPP TS 38.211 V0.1.0 (Jun. 2017).

Third Generation Partnership Project, "Technical Specification Group Radio Access Network; NR; Medium Access Control (MAC) protocol specification (Release 15)," 3GPP TS 38.321 V0.2.0 (Aug. 2017).

Third Generation Partnership Project, "Technical Specification Group Radio Access Network; NR; NR and NG-RAN Overall Description; Stage 2 (Release 15)," 3GPP TS 38.300 V0.4.1 (Jun. 2017).

Third Generation Partnership Project, "Technical Specification Group Radio Access Network; Study on Scenarios and Requirements for Next Generation Access Technologies; (Release 14)," 3GPP TR 38.913 V0.3.0 (Mar. 2016).

Third Generation Partnership Project, "Technical Specification Group Radio Access Network; Study on Scenarios and Requirements for Next Generation Access Technologies; (Release 14)," 3GPP TR 38.913 V14.2.0 (Mar. 2017).

Third Generation Partnership Project, "Technical Technical Specification Group Radio Access Network; Evolved Universal Terrestrial Radio Access (E-UTRA); Physical channels and modulation (Release 13)," 3GPP TS 36.211 V13.2.0 (Jun. 2016).

Third Generation Partnership Project, "Technical Technical Specification Group Radio Access Network; NR; Radio Resource Control (RRC); Protocol specification (Release 15)," 3GPP TS 38.331 V0.0.4 (Jun. 2017).

Xinwei et al., "WF on DL PRB Bundling Size Value Set ," 3GPP TSG RAN WG1 RAN1 #89, R1-1709791, Hangzhou, P.R. China (May 15-19, 2017).

Zte et al., "Forward compatibilty for numerology and frame structure design," 3GPP TSG-RAN WG1 Meeting #85, R1-164261, Nanjing, China (May 23-27, 2016).

Panasonic, "Use of multiple numerologies in NR," 3GPP TSG RAN WG1 Meeting #86, R1-167439, Gothenburg, Sweden (Aug. 22-26, 2016).

Convida Wireless, "Discussion on Sync Signals Supporting Different Numerologies," 3GPP TSG RAN WG1 Meeting #86, Gothenburg, Sweden, R1-167847 (Aug. 22-26, 2016).

Intel Corporation, "Design on NR DL Synchronization," 3GPP TSG RAN WG1 Meeting #86, Gothenburg, Sweden, R1-167705 (Aug. 22-26, 2016).

* cited by examiner

METHODS FOR FLEXIBLE RESOURCE USAGE

CROSS REFERENCE TO RELATED APPLICATIONS

This application is the U.S. National Stage, under 35 U.S.C. § 371, of International Application No. PCT/US2017/046105 filed Aug. 9, 2017, which claims the benefit of provisional application 62/373,089 filed on Aug. 10, 2016 and provisional application 62/400,950 filed on Sep. 28, 2016, the contents of which are hereby incorporated by reference herein.

BACKGROUND

In mobile communication, there are generational advancements in wireless technologies. For instance, in 1980 the first generation of wireless technology was established. By the late 1980s, a second generation followed. This pattern, albeit at varying paces of development, continues. Some generations of technology have been retired, while others are still being developed concurrently with other generations. All generations of wireless technology require standards, protocols, hardware, and other related developments. With each new generation, these same concerns must be addressed.

SUMMARY

A method and system for flexible resource control for a wireless transmit/receive unit (WTRU) is disclosed. The WTRU may monitor a first control channel region and receive a first control channel transmission in the first control region indicating boundaries of a plurality of numerology blocks of a carrier. The WTRU may then receive a second control channel transmission in a second control channel of a second control region, wherein the second control channel transmission indicates one or more numerology parameters for at least one of the plurality of numerology blocks. The WTRU may then send or receive data based on the one or more numerology parameters of the one or more numerology blocks.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
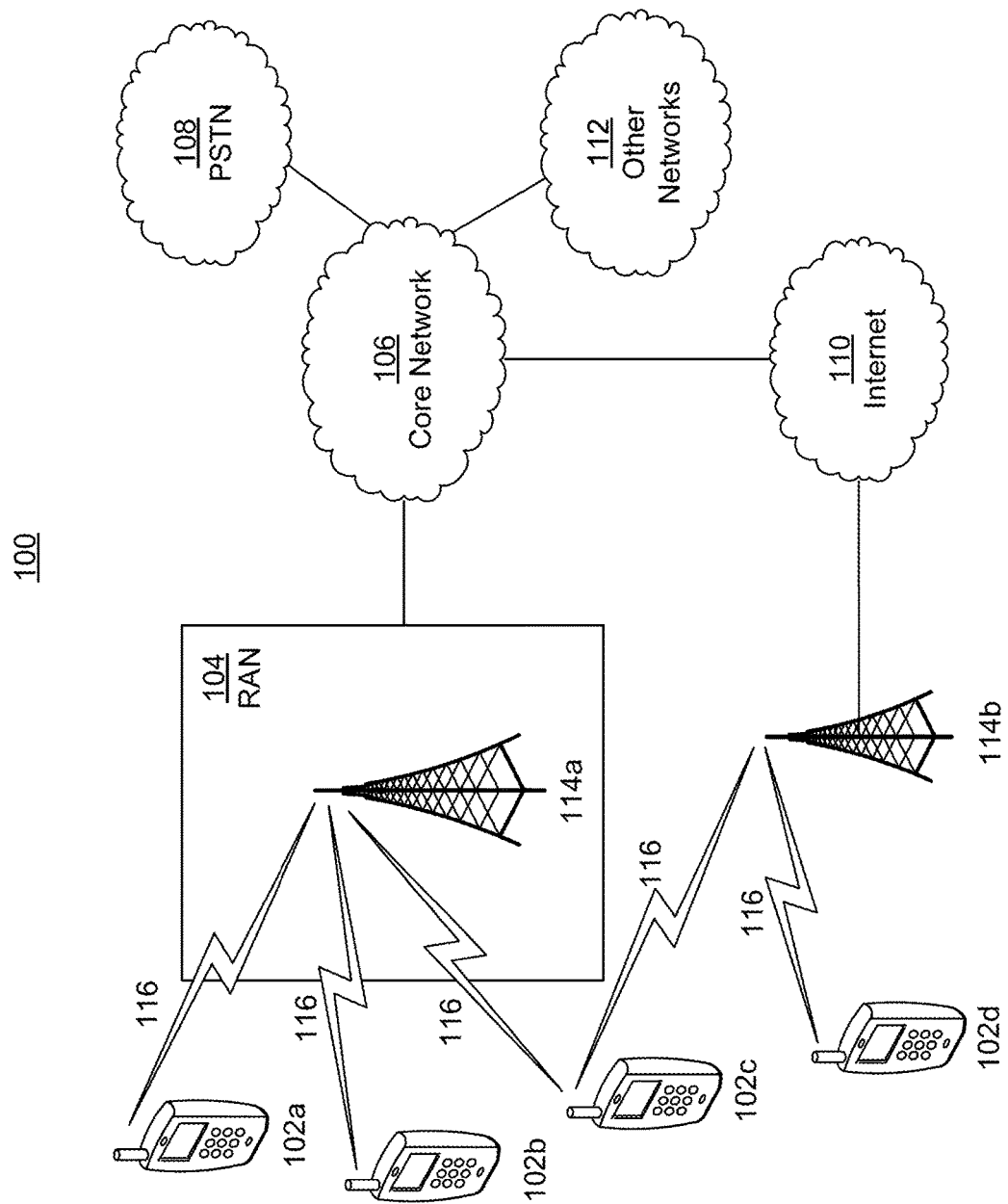
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a next generation (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 Evolution Data Only/Evolution Data Optimized (EV-DO), Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
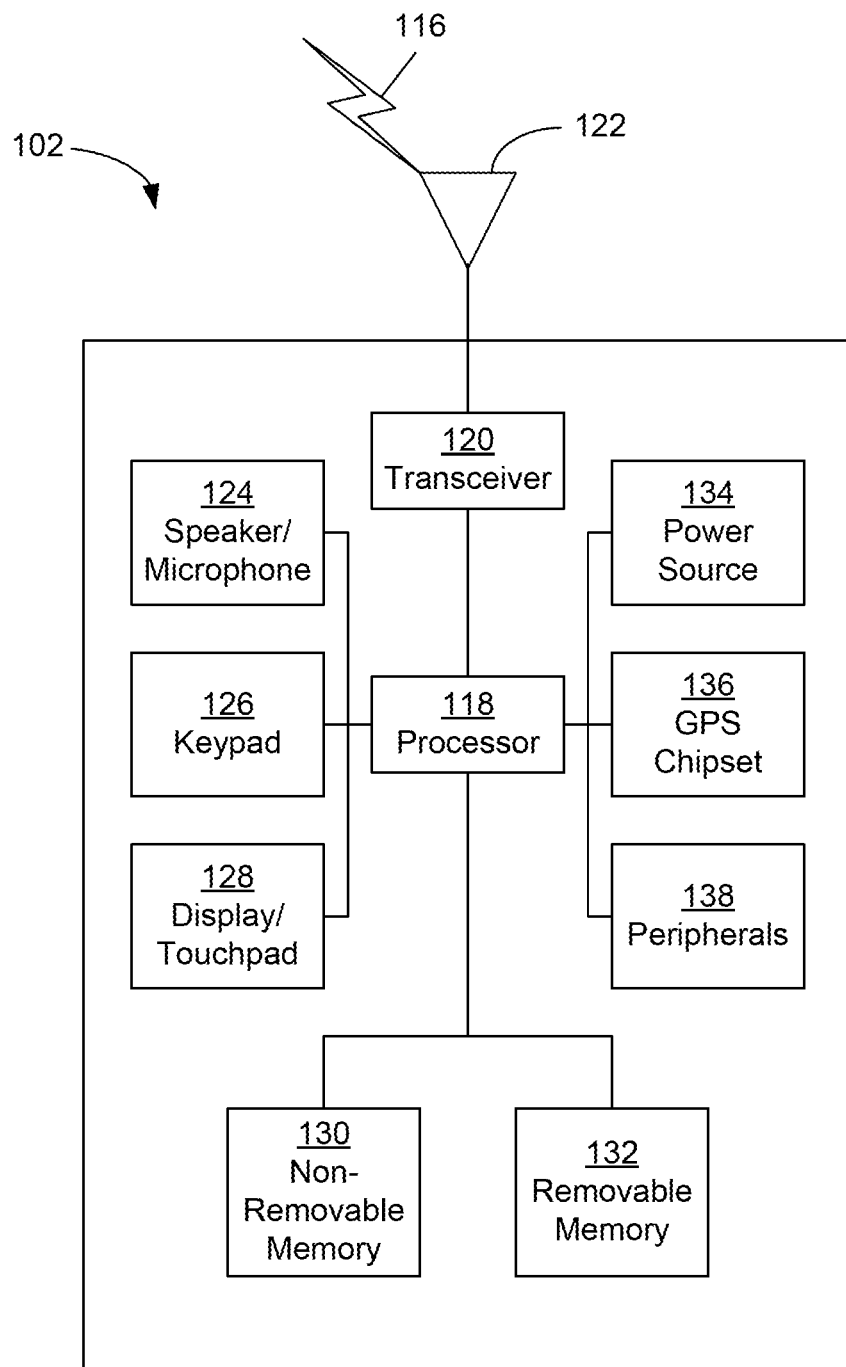
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
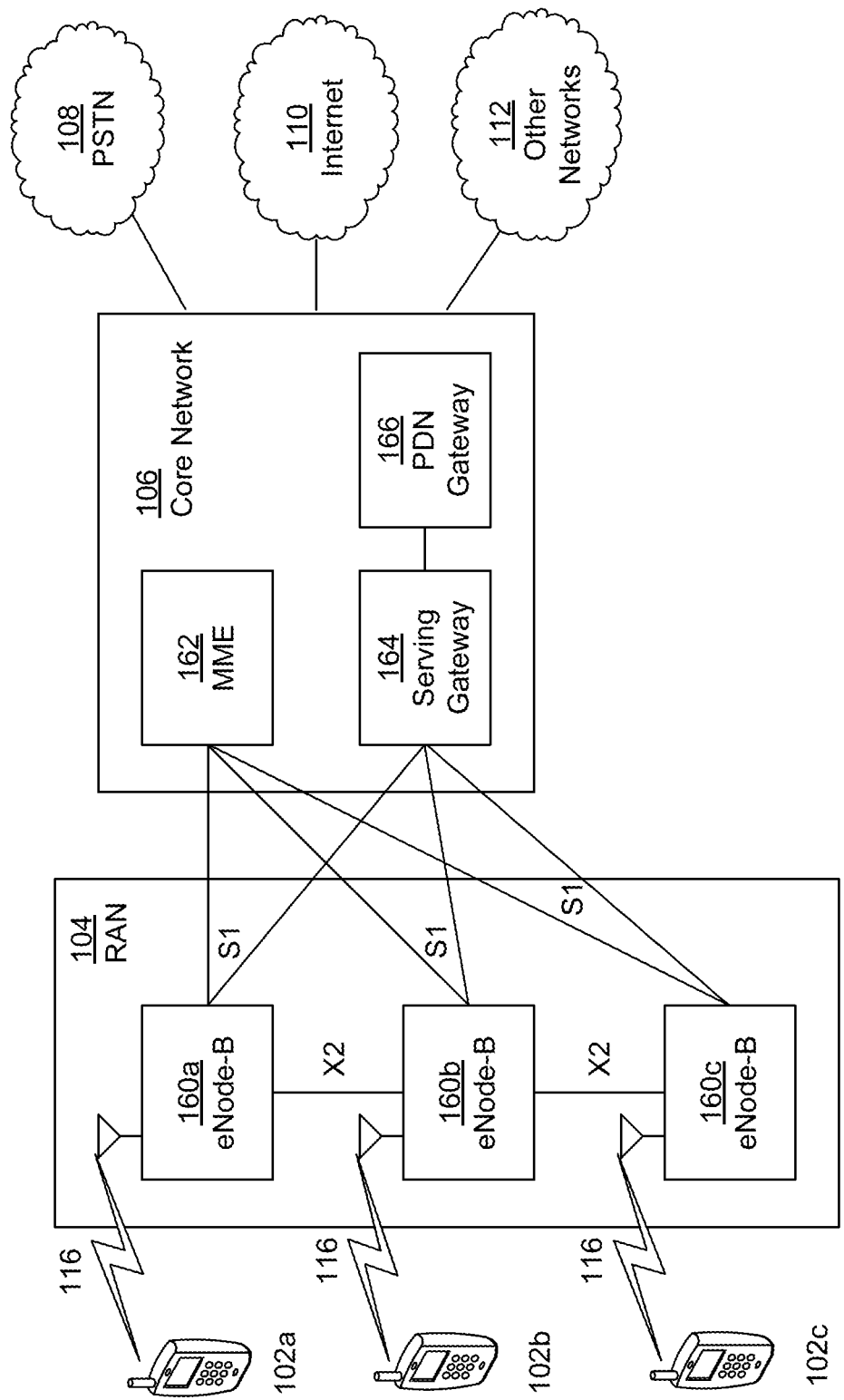
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remain idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
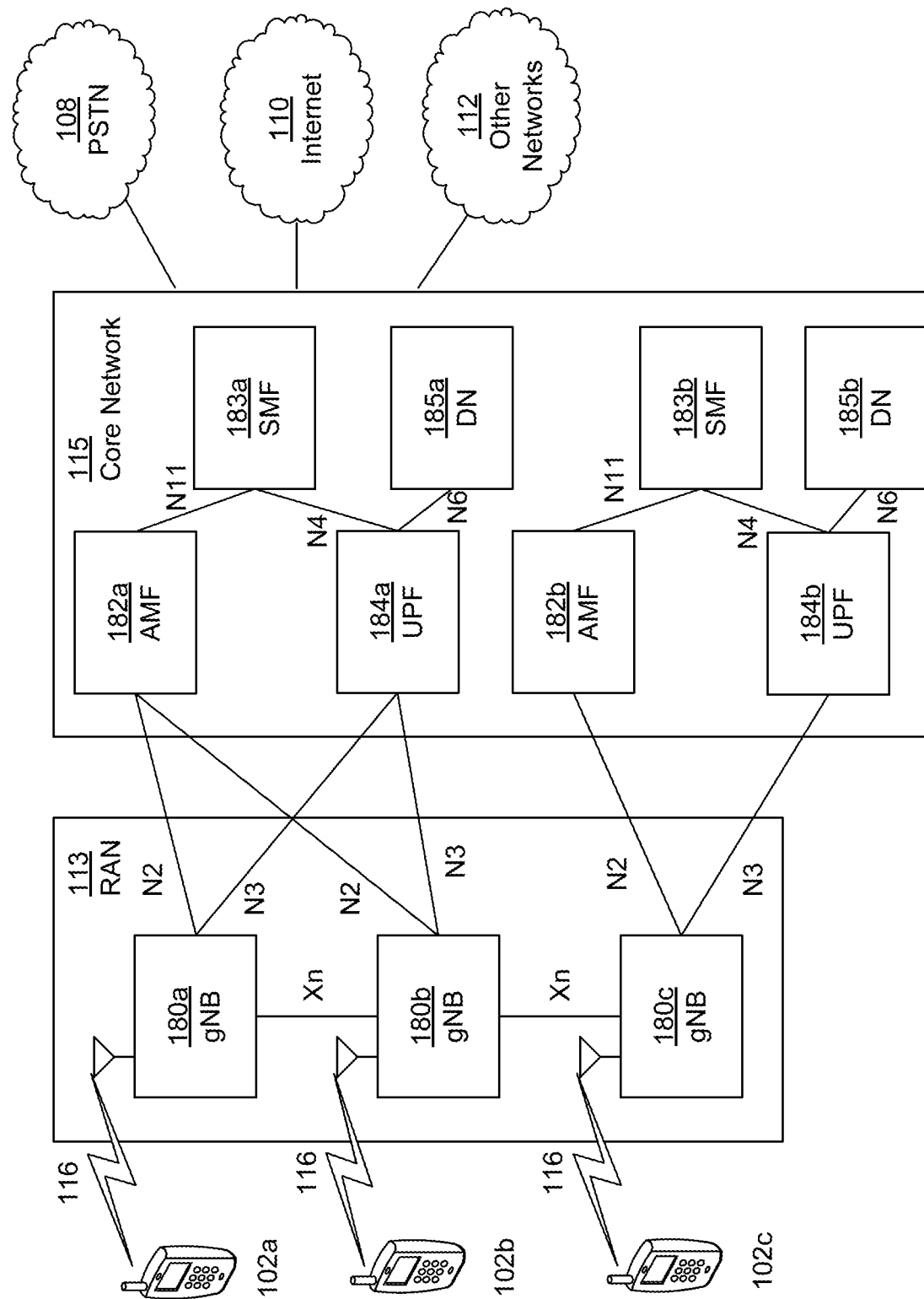
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements is depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182a/182b may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In one embodiment a WTRU may operate on a fifth generation (5G) of technology. A 5G air interface may have the following non-exhaustive uses: Improved broadband performance (IBB); Industrial control and communications (ICC) and vehicular applications such as vehicle to everything (V2X) or vehicle to vehicle (V2V); Massive Machine-Type Communications (mMTC). These example uses may have the following requirements for the air-interface which are further discussed herein: support for ultra-low transmission latency (ULLC or LLC); support for ultra-reliable transmission (URC); and/or Support for MTC operation (including narrowband operation).

Support for LLC may involve an air interface latency with a 1ms round trip time (RTT), which may in turn require support for time transmission intervals (TTIs), for example, in a range between 100 us and (no larger than) 250 us. Support for ultra-low access latency is also a consideration, which is defined as the time from initial system access until the completion of the transmission of the first user plane data unit). For example, IC and V2X may require end-to-end (e2e) latency of less than 10 ms.

Support for URC may involve improved transmission reliability as compared to LTE systems. For example, one target is 99.999% transmission success and service availability. Another consideration is support for mobility for speed in an example range of 0-500 km/h. IC and V2X may require a Packet Loss Ratio (PLR) of less than $10e^{-6}$.

Support for MTC operation (including narrowband operation) may involve an air interface that supports narrowband operation (e.g., using less than 200 kHz), extended battery life (e.g. up to 15 years of autonomy) and minimal communication overhead for small and infrequent data transmissions (e.g., low data rate in the range of 1-100 kbps with access latency of seconds to hours).

In a wireless communications technology, such as 5G, the WTRU may be configured to perform transmissions according to one or more Spectrum Operating Modes SOMs. For example, a SOM may correspond to transmissions that use at least one of the following: a specific TTI duration, a specific initial power level, a specific HARQ processing type, a specific upper bound for successful HARQ reception/transmission, a specific transmission mode, a specific physical channel (uplink or downlink), a specific waveform type or even a transmission according to a specific RAT (e.g. legacy LTE or 5G transmission method). A SOM may correspond to a quality of service (QoS) level and/or related aspect e.g. maximum/target latency, maximum/target block error rate (BLER) or similar. A SOM may correspond to a spectrum area and/or to a specific control channel or aspect thereof (including search space, downlink control information (DCI) type, etc.). For example, a WTRU may be configured with a SOM for each of a URC type of service, an LLC type of service and an MBB type of service. A WTRU may have a configuration for a SOM for system access and/or for transmission/reception of L3 control signaling (e.g., radio resource control (RRC)) e.g. in a portion of a spectrum associated with the system such as in a nominal system bandwidth (further discussed herein).

In a wireless communications technology, such as 5G, multi-carrier signals may be supported. For comparison, LTE employs multi-carrier signals such as Orthogonal Frequency Division Multiplexing (OFDM) or SC-FDMA. Use of a multi-carrier signal may result in high spectrum efficiency, efficient multiplexing of users on a carrier, and implementation efficiency. Multi-carrier signals may be characterized by a limited number of parameters such as sub-carrier spacing, symbol duration, and/or (when applicable) cyclic prefix or time guard duration.

In a wireless communications technology, such as LTE, there may be a finite and small number of combinations of the parameters discussed herein that may be applicable. For example, in the downlink the subcarrier spacing may be set to 15 kHz (a value of 7.5 kHz is also specified for multimedia broadcast multicast service (MBMS) but may not be fully supported in some configurations) and the type of signal may be OFDM. In the uplink, the subcarrier spacing may be set to 15 kHz for all signals and channels except for physical random access channel (PRACH), which may use smaller values (7.5 kHz and 1.25 kHz). The type of uplink signal may be Single-Carrier Frequency Division Multiplex (SC-FDM). The main subcarrier spacing value of 15 kHz may be suitable considering propagation characteristics in deployments targeted by LTE. More specifically, subcarrier spacing may be high compared to expected Doppler spread values given a maximum speed and frequency bands used by a WTRU, and the symbol duration may be high compared to the duration of the cyclic prefix required to avoid inter-symbol interference due to delay spread. In an example, two possible durations are defined for the cyclic prefix (CP): a "normal CP" of approximately 5 microseconds; and, an "extended CP" of approximately 17 microseconds. The latter value may be used in scenarios where the expected delay spread is larger.

In a wireless communications technology, such as 5G, there may be bandwidth flexibility. In one embodiment, a 5G air interface may have different transmission bandwidths on both uplink and downlink ranging from anything between a nominal system bandwidth up to a maximum value corresponding to the system bandwidth.

For single carrier operation, supported system bandwidths may, for example, include at least 5, 10, 20, 40 and 80 MHz. Supported system bandwidths may be any bandwidth in a given range (e.g., a few MHz up to 160 MHz). Nominal bandwidths may have one or more fixed values. Narrowband transmissions of up to 200 kHz may be supported within the operating bandwidth for MTC devices.

Figure 2:
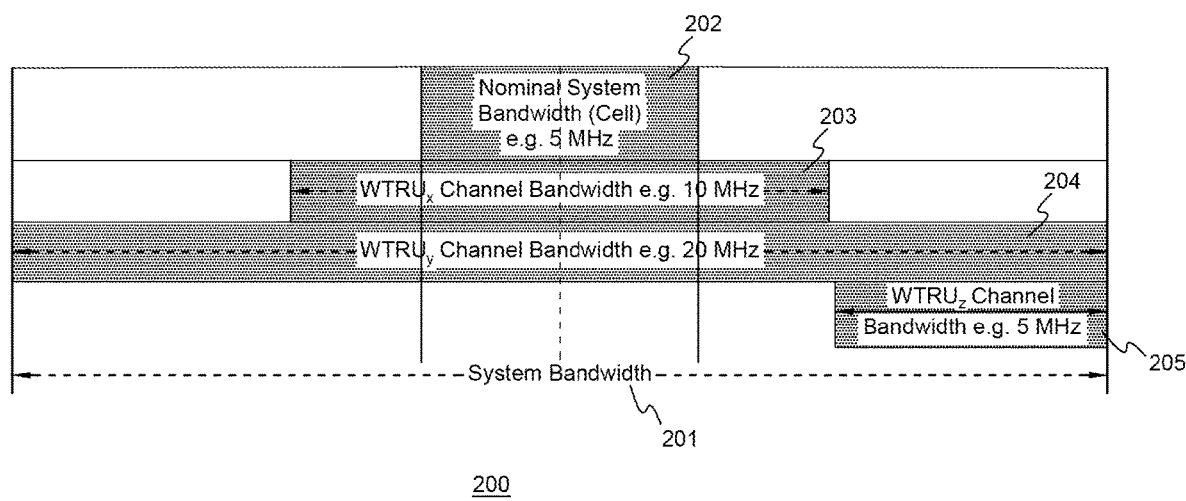
FIG. 2 is a diagram showing an example of transmission bandwidths.

FIG. 2 is a diagram showing an example of transmission bandwidths 200. System bandwidth 201, as discussed herein, may represent the largest portion of spectrum that can be managed by the network for a given carrier, which in the example shown in FIG. 2 is 20 MHz. For such a carrier, the portion that a WTRU minimally supports for cell acquisition, measurements, and initial access to the network, may correspond to the nominal system bandwidth 202, which in the example shown in FIG. 2 is 5 MHz. A WTRU may be configured with a channel bandwidth that is within the range of the entire system bandwidth. For example, WTRUx may have a channel bandwidth 203 of 10 MHz, WTRUy may have a channel bandwidth 204 of 20 MHz, and WTRUz may have a channel bandwidth 205 of 5 MHz but allocated on an end of the system bandwidth. A WTRU's configured channel bandwidth may or may not include the nominal part of the system bandwidth.

Bandwidth flexibility may be achieved because all applicable set of RF requirements for a given maximum operating bandwidth in a band may be met without the introduction of additional allowed channel bandwidths for that operating band due to efficient support of baseband filtering of the frequency domain waveform.

Methods to configure, reconfigure, and/or dynamically change the WTRU's channel bandwidth for single carrier operation may be described herein as well as methods to allocate spectrum for narrowband transmissions within the nominal system bandwidth, total system bandwidth, or configured channel bandwidth.

In a wireless communications technology, such as 5G, the physical layer of an air interface may be band-agnostic and may support operation in licensed bands below 5 GHz as well as operation in bands in the range 5-6 GHz. For operation in the unlicensed bands, listen before talk (LBT) Cat 4 based channel access framework similar to LTE licensed assisted access (LAA) may be supported.

Methods to scale and manage (e.g., scheduling, addressing of resources, broadcasted signals, measurements) cell-specific and/or WTRU-specific channel bandwidths for arbitrary spectrum block sizes are also considerations for any wireless technology, such as 5G.

Figure 3:
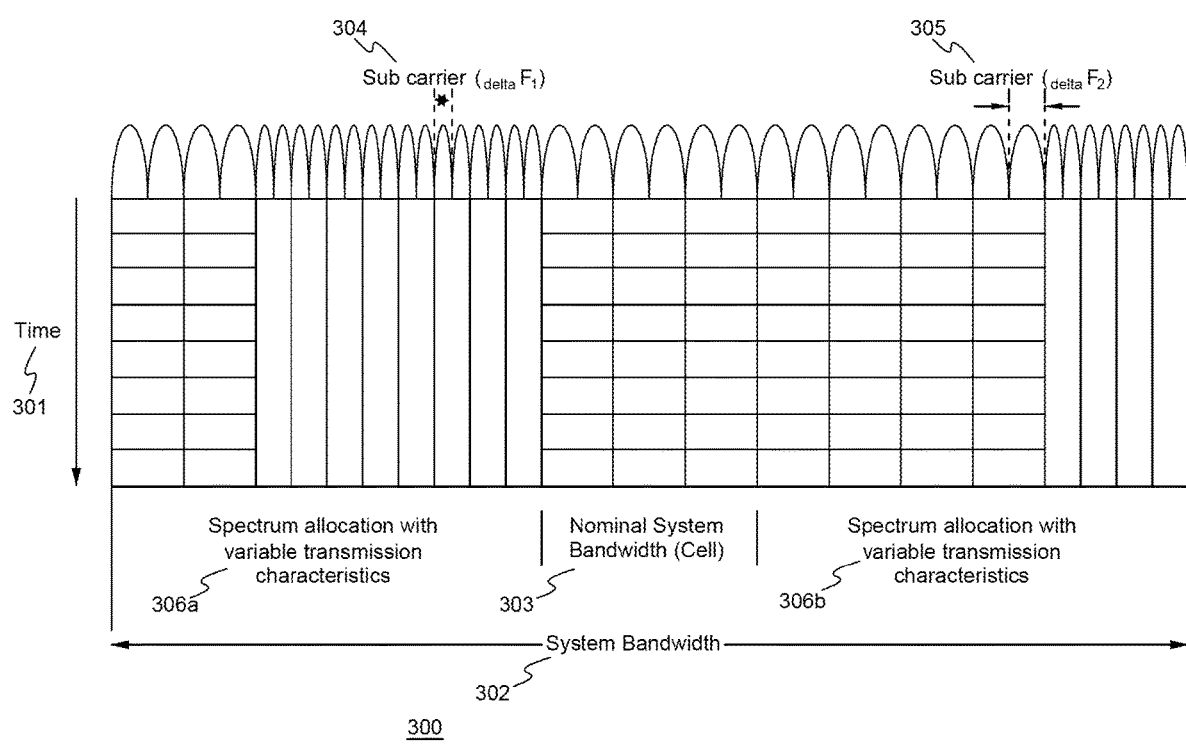
FIG. 3 is a diagram showing an example of flexible spectrum allocation.

FIG. 3 is a diagram of an example flexible spectrum allocation 300 for wireless communication technology, such as 5G. In the example flexible spectrum allocation 300, system bandwidth 302 is shown in increments horizontally (e.g., 20 MHz), and time 301 is shown in increments vertically. Subcarrier spacing 304 may be of a first value $_{delta}F_1$ and may span a spectrum allocation with variable transmission characteristics 306a. Subcarrier spacing 305 may be of a second value $_{delta}F_2$, possibly larger than subcarrier spacing 304, and may span a spectrum allocation with variable transmission characteristics 306b. There may be a nominal portion of bandwidth 303 comprising a cell (e.g., 5 MHz).

Downlink control channels and signals may support frequency division multiplexing (FDM) operation. In FDM operation, a WTRU may acquire a downlink carrier by receiving transmissions using only the nominal part 303 of the system bandwidth 302; for example, the WTRU may not initially need to receive transmissions covering the entire system bandwidth 302 that is being managed by the network for the concerned carrier.

Downlink data channels may be allocated over a bandwidth that may or may not correspond to the nominal system bandwidth 303, without restrictions other than being within the WTRU's configured channel bandwidth. For example, the network may operate a carrier with a 12 MHz system bandwidth using a 5 MHz nominal bandwidth 303 allowing devices supporting at most 5 MHz maximum RF bandwidth to acquire and access the system while allocating +10 to −10 MHz of the carrier frequency to other WTRU's supporting up to 20 MHz worth of channel bandwidth.

The example of spectrum allocation in FIG. 3 may have, at least conceptually, different subcarriers assigned to different modes of operation, i.e. spectrum operation modes (SOMs). Different SOMs may be used to fulfill different requirements for different transmissions. A SOM may consist of at least a subcarrier spacing, a TTI length, and one or more reliability aspects such as HARQ processing or a secondary control channel. Further, a SOM may be used to refer to a specific waveform or may be related to a processing aspect; for example, a SOM may relate to the co-existence of different waveforms in the same carrier using FDM and/or TDM; in another example, a SOM may relate to the co-existence of frequency division duplexing (FDD) operation in a time division duplexing (TDD) band that is supported, such as in a TDM manner or the like.

In a wireless communications technology, such as 5G, a system signature may be considered. A WTRU may be configured to receive and/or detect one or more system signatures. A system signature may consist of a signal structure using a sequence. The signal may be similar to a synchronization signal (SS) similar to LTE primary synchronization signals (PSS) and/or secondary synchronization signals (SSS). The signature may be specific (e.g. uniquely identifiable) to a particular node, or a Transmission/Reception Point, TRP, within a given area or it may be common to a plurality of such nodes or TRPs within an area; the signature information may not be known and/or relevant to the WTRU. The WTRU may determine and/or detect a system signature sequence and further determine one or more parameters associated with the system. For example, the WTRU may derive an index therefrom and may use the index to retrieve associated parameters from within a table as described herein. In another example, the WTRU may use a received power associated with a signature for open-loop power control, for the purpose of setting the initial transmission power if the WTRU determines that it may access, and/or transmit, using applicable resources of the system. In yet another example, the WTRU may use the timing of a received signature sequence such as for the purpose of setting the timing of a transmission (e.g., a preamble on a PRACH resource) if the WTRU determines that it may access, and/or transmit, using applicable resources of the system.

In a wireless communications technology, such as 5G, an access table may store parameters for use by a WTRU. A WTRU may be configured with a list of one or more entries. The list may be referred to as an access table and may be indexed whereby each entry may be associated with a system signature and/or to a sequence thereof. The access table may provide initial access parameters for one or more areas. Each entry may provide one or more parameters necessary for performing an initial access to the system. Parameters may include at least one of a set of one or more random access parameters e.g. including applicable physical layer resources (e.g. PRACH resources) in time and/or frequency, initial power level, physical layer resources for reception of a response. Parameters may further include access restrictions such as including public land mobile network (PLMN) identity and/or closed subscriber group (CSG) information. Parameters may also include routing-related information such as the applicable routing area(s). Each entry may be associated with, and/or indexed by, a system signature. For example, an entry may be common to a plurality of nodes or TRPs. The WTRU may receive an access table by means of a transmission using dedicated resources, such as by RRC configuration and/or by means of a transmission using broadcasted resources. When the WTRU receives an access table by means of a transmission using broadcasted resources, the periodicity of the transmission of an access table may be relatively long (e.g., up to 10240 ms); the transmission may be longer than the periodicity of the transmission of a signature (e.g., in the range of 100 ms).

In a wireless communications technology, such as 5G, an air interface may need to support a wide variety of frequency bands and use cases such as eMBB, URLLC, and mMTC. Due to the CAPEX/OPEX of network deployments, it may be desirable to multiplex the different use cases on the same contiguous block of spectrum. Each use case may have its own requirements that lead to the need for different transmission parameters, including signal structure, numerology (e.g. subcarrier spacing (SCS), symbol size, CP length, etc.) and the like.

As described herein, transmission parameter, signal structure or numerology may be used interchangeably and may be defined or parameterized by at least one of: a waveform (e.g. OFDM, SC-FDMA, zero-tail DFT-spread OFDM, or the like); parameter associated with a waveform, such as subcarrier spacing (SC S), cyclic prefix (CP) length, symbol size or the like; parameter associated with a transmission, for example the number of symbols that make up a transmission opportunity or the location and/or timing of a scheduling opportunity, or another example may be unlicensed channel access parameters (e.g. listen-before talk or clear channel assessment parameters); multiple access schemes such as OFDMA, NOMA (including any variant of non-orthogonal multiple access) or the like; a condition where a transmission is received or transmitted by a node (e.g. whether a transmission is UL or DL at the WTRU); and/or use case (i.e. eMBB, URLLC, mMTC).

In a method and system for flexible resource usage, a carrier's bandwidth may be segmented into numerology blocks. A carrier may be configured to support different transmission types, each associated with a different numerology. Such support may be done by enabling the multiplexing of different numerologies using at least one of: frequency domain multiplexing (FDM), whereby each supported numerology may be associated with a portion of the spectrum allocated to the carrier; time division multiplexing (TDM), whereby each supported numerology may be associated with a specific time; spatial domain multiplexing (SDM), whereby each supported numerology may be associated with a specific precoder or beam (e.g. transmitter beam or receiver beam or beam pair). For example, a TRP may support concurrent transmission on multiple analog beams, each with a different numerology, and/or code domain multiplexing, whereby each supported numerology may use an orthogonal spreading sequence.

A block, region, or portion of a carrier may be defined by at least one of: a frequency range, for example a contiguous frequency range or a non-contiguous set of frequency ranges; a time portion, for example a contiguous time portion or a non-contiguous set of time portions, wherein the time portion may repeat indefinitely, e.g. in a periodic manner; a beam (e.g. transmitter beam, or receiver beam or beam pair) or a set of beams; and/or a spreading sequence or a set of spreading sequences.

A block, region, or portion of a carrier may be configured or associated with a numerology and may thus be called a numerology block (or region or portion). A carrier may be composed of one or multiple numerology block(s).

In a method and system for flexible resource usage a carrier's bandwidth may be segmented into numerology blocks, wherein there may be multiple numerologies per numerology block. A numerology block may be defined by a block or region or portion of a carrier along with more than one numerology. For example, in TDD a numerology block may be defined to have a first numerology for UL transmissions and a second numerology for DL transmissions.

In another example, a numerology block may be defined as having a set of numerologies, each may be associated with one or more physical channels, wherein the control channels may have a first numerology, and the data channels may have a second numerology.

In yet another example, a numerology block may be associated with a numerology for WTRU specific transmissions. Any broadcast or common transmissions may use a pre-configured and pre-determined numerology. For example, a system information block may provide the numerology or signal structure of broadcast information. The system information block may also indicate the location (e.g. in frequency, time, beam, etc.) of the broadcast information. In this example, the WTRU may be configured to understand that a numerology associated with a numerology block may not be valid for all instances of the block or region or portion of the carrier indicated. Instead, it may only be valid for resources not associated with broadcast or common transmissions.

In a method and system for flexible resource usage a carrier's bandwidth may be segmented into numerology blocks, wherein there may be parameters associated with a numerology block. A numerology block may be configured with a set of parameters to enable scheduling of data transmissions. The set of parameters may include at least one of: a definition of a resource block size, for example a resource block (RB) may be defined by a bandwidth portion and depending on the subcarrier spacing of a numerology may have a different number of subcarriers or the RB may be defined as a number of subcarriers and depending on the subcarrier spacing may occupy different bandwidth portion; a definition of a subframe length, for example a subframe length may be defined by an absolute time value and depending on the symbol length of a numerology may have different number of symbols or a subframe length may be defined by a number of symbols and depending on the symbol length of a numerology may have different absolute time duration; a timing for a scheduling opportunity or a slot length, where a scheduling opportunity (or a slot boundary) may be defined as a time where a control channel may be received by a WTRU indicating a scheduling assignment (e.g., when subframes or slots may begin) or grant for one or more upcoming subframes (e.g., the subframes may not be adjacent in time and may have unused time periods where unused time periods may be used to ensure proper synchronization between different numerology blocks in different frequency regions); switching timing for UL to DL or DL to UL, which may be explicitly configured in a TDD system to ensure that all numerology blocks have aligned UL/DL boundaries regardless of SCS, for example.

Figure 4:
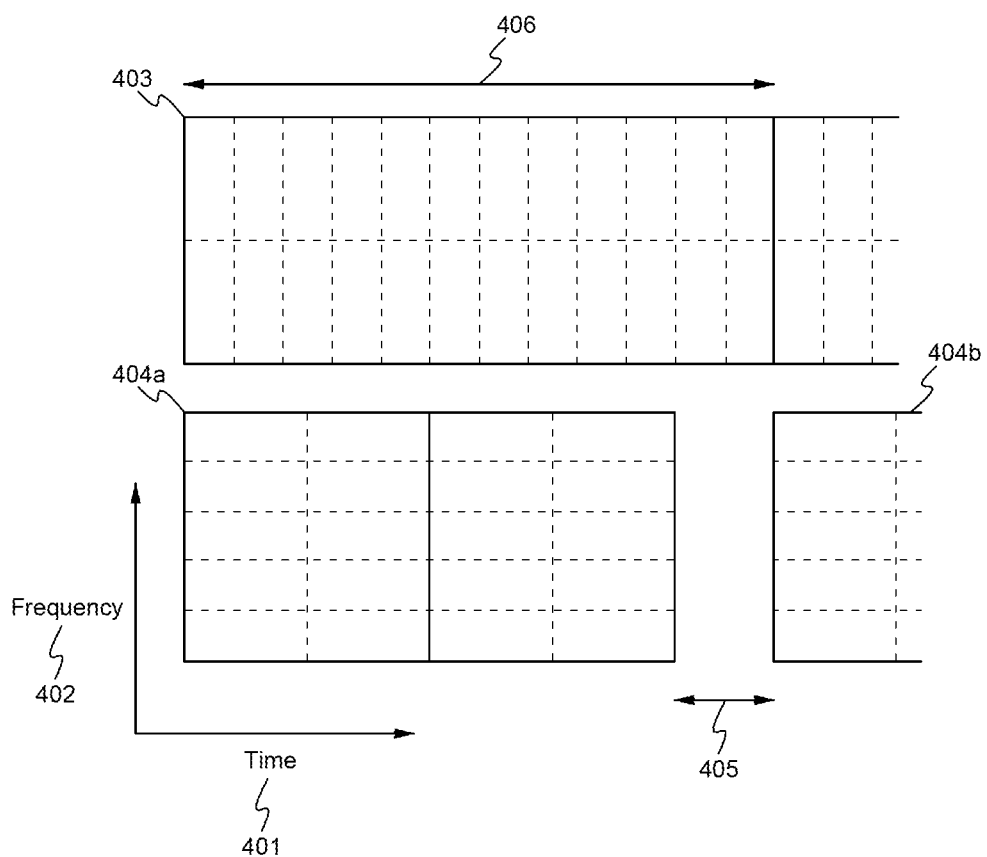
FIG. 4 is a graph of an example showing non-adjacent slots/subframes ensuring slot/subframe synchronization between different numerology blocks.

FIG. 4 shows an example of non-adjacent subframes or slots that enable subframe synchronization between different numerology blocks in a same carrier. Additionally/alternatively multiple subframes or slots may occur between every scheduling opportunity. Additionally/alternatively, different numerology blocks may have different subframe or slot duration or scheduling opportunity periodicity. Time 401 is shown on the horizontal axis and frequency 402 is shown on the vertical axis. One scheduling opportunity is shown with 406. In the example shown, the subframe 404*a* or an integer multiple thereof, may not take up the entire scheduling opportunity 406. The next subframe 404*b* would be the same as 404*a* and the subframe 404*b* would start at the end of the first scheduling opportunity 406. The block of subframes 403 represent an alternative scheduling example where the subframe takes up the entire scheduling opportunity. The gap between 404*a* and 404*b* may be unused resources used to synchronize subframes between the two numerology blocks. Note also that in this example, the scheduling example 404*a* is broken up into blocks or symbols, that are two and a half times as long in time as the scheduling example 403 blocks.

In one embodiment, some or all of the parameters discussed herein may be configured or indicated simultaneously to the configuration or indication of the numerology blocks. In another embodiment, some or all of the parameters may be indicated within a scheduling assignment or grant. For example, a WTRU may be scheduled for a downlink transmission, and the scheduling information may include the numerology block where the transmission may occur, along with the subframe length measured in units of symbols.

A numerology block may have more than one set of parameters. For example, a numerology block in TDD may have different parameters for UL and for DL.

In a method and system for flexible resource usage, a carrier's bandwidth may be segmented into numerology blocks, wherein the multiple numerology blocks may span the entire spectrum allocated to a carrier. In another embodiment, the multiple numerology blocks may not span the entire spectrum and may have spacing between at least some of the numerology blocks. Such spacing may be configured as guard bands.

One or more guard bands may be configured when FDM is used to support multiple numerology blocks. In one embodiment, a boundary between two blocks may be configured with a guard band or guard band area. For example, a block may be configured (e.g., similarly to a numerology block) to indicate resources used for a guard band. In another embodiment, a numerology block may be configured with one or two guard bands at one or both of its frequency edges within or immediately outside the resources of the numerology block.

A guard band or guard band area may be considered as a set of frequencies and/or time resources where a WTRU expects no transmission from another node, nor may it be expected to be granted resources for transmission to (or to autonomously select resources from) another node. One or more guard band areas may be configured jointly with the configuration of at least one numerology block. Alternatively, one or more guard band areas may be independently configured.

A guard band's frequency span may be defined in absolute spectrum width. In another embodiment, a guard band's frequency span may be defined in terms of a subcarrier spacing specifically assigned for guard band definition. In yet another embodiment, a guard band's frequency span may be defined in terms of subcarriers, assuming the subcarrier spacing of at least one of the adjacent numerology blocks.

Similarly, a guard band's time duration may be defined in absolute time units, in terms of a symbol duration assigned to guard band definition, or in terms of a symbol duration of at least one adjacent numerology block.

In a method and system for flexible resource usage, a carrier's bandwidth may be segmented and configured into numerology blocks. As discussed herein, the configuration or indication of a numerology block may also be applicable to the configuration or indication of a guard band or guard band area.

A carrier may be segmented into multiple numerology blocks. In one embodiment, a WTRU needs to know the boundaries of at least one numerology block along with the parameters associated with transmissions on at least one numerology block. The boundaries and the parameters of the at least one numerology block may be indicated jointly or separately.

One or more numerology block boundaries or sets of parameters may be indicated semi-statically. For example, one or more boundaries or sets of parameters may be indicated in a transmission enabling the WTRU to perform initial access. For example, a system information block or a signature sequence or synchronization signal may indicate at least one boundary and a set of parameters for at least one numerology block. Such a numerology block may be used by the WTRU to receive further information to continue with initial access. The original system information block, signature sequence, or synchronization signal may be transmitted with a fixed numerology and set of numerology parameters. In another example, multiple numerologies may be supported for the original system information block, signature sequence, or synchronization signal, and a WTRU may blind decode to determine the appropriate numerology of that transmission.

Additionally, the at least one boundary or sets of parameters for at least one numerology block may be indicated semi-statically by higher layer signaling (e.g., RRC signaling). For example, one or more WTRUs may receive a transmission that indicates at least one boundary or set of parameters for at least one numerology block.

In a method and system for flexible resource usage, a carrier's bandwidth may be segmented into numerology blocks, wherein the numerology block may be configured for dynamic indication. Further, one or more numerology block boundaries or sets of parameters may be indicated dynamically. For example, downlink control information (DCI) may indicate the boundary and set of parameters of at least one numerology block. The DCI transmission may use common control signaling (e.g., including a group radio network identifier (RNTI) identifier or the like); this may enable a group of WTRUs to be updated with new boundaries for at least one numerology block and/or new sets or sets of parameters for at least one numerology block. The DCI transmission may occur periodically, for instance, according to a configuration provided by higher layers. The transmission may be repeated over more than one downlink beam to ensure uniform coverage.

In another example, in a DCI scheduling transmission (for either DL or UL) the appropriate numerology (or numerologies) may be indicated to the WTRU to be used in the resources that the WTRU is scheduled to transmit or receive data.

The dynamic indication of the configuration of at least one numerology block may be done in two parts. For example, the boundaries of at least one numerology block may be changed less frequently and may thus be indicated in a control channel (e.g. DCI) that is less frequently transmitted. A TRP (e.g., eNB) may transmit a second control channel transmission (e.g., DCI) indicating the sets of parameters for the numerology blocks using the previously indicated boundaries. Such a transmission may be more frequent than the first, to enable more dynamic control over the numerology parameters.

The search space of the first and second control channel transmissions may occupy the same or different frequency portion of the carrier. For example, the first and/or second control channel transmissions may be transmitted in a control region that spans the entire bandwidth of the carrier using a fixed (i.e., known by the WTRU) numerology. Alternatively, the search space of a control channel transmission may span a portion of the bandwidth of the carrier. For example, the search space may span all the bandwidth portions that are being configured or reconfigured. In another alternative, the search space may span only the bandwidth portions that are being configured/reconfigured with a same set of numerology parameters; given this, multiple numerology blocks (e.g., disjointed blocks) may be configured/reconfigured with the same set of numerology parameters. In this case, the search space of the control channel may span disjoint frequencies where the same numerology parameters are used.

The search space of first and/or second control channel transmission may use the same boundary and/or set of numerology parameters as that for the numerology block it is configuring/reconfiguring. This may require a WTRU to blindly determine the boundaries and/or sets of numerology parameters of the control channel(s). Alternatively, a control channel used to configure/reconfigure the boundaries and/or sets of parameters of at least one numerology block may use a predetermined and configurable/reconfigurable boundary and numerology.

Figure 5A:
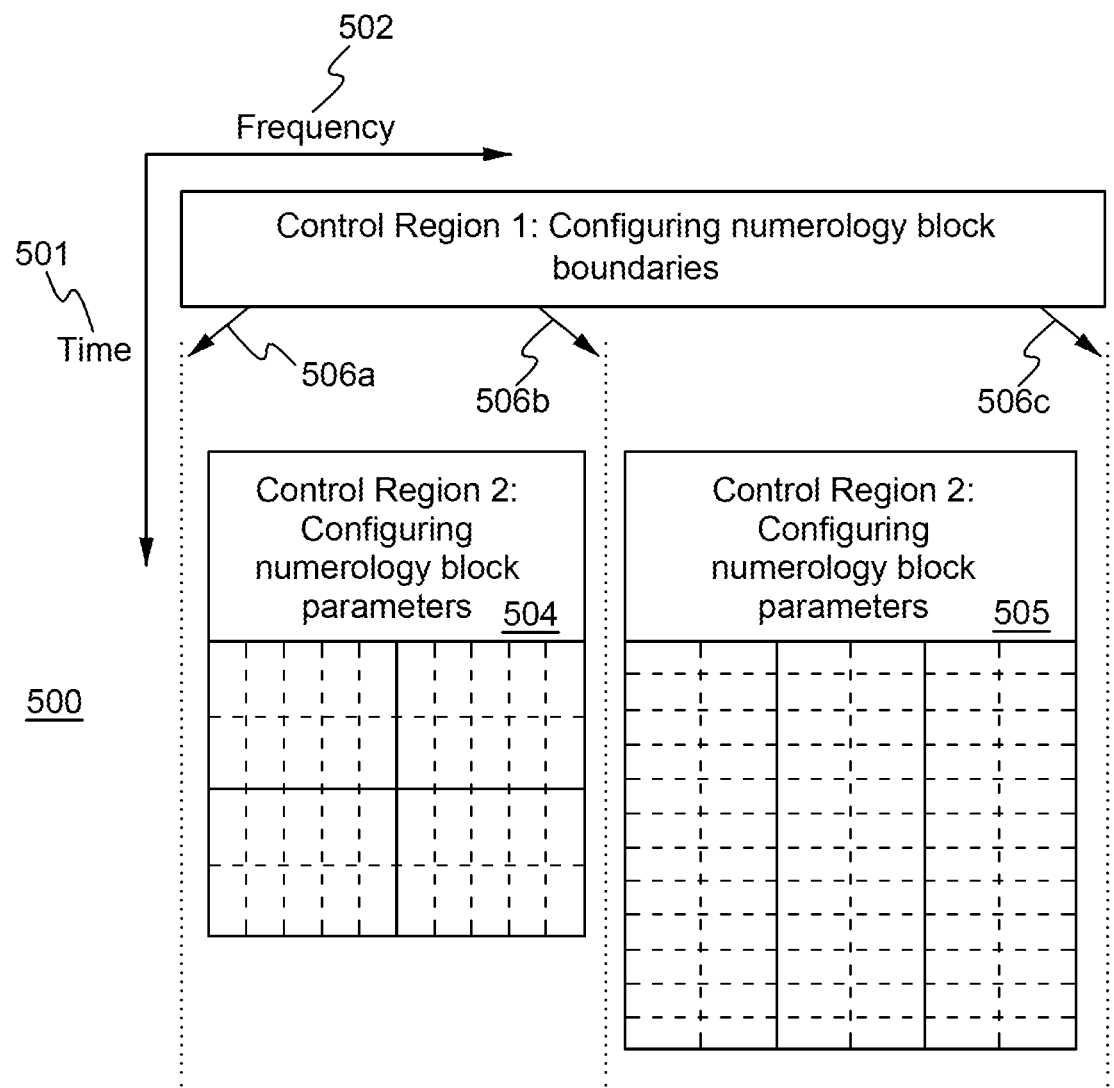
FIG. 5A is a graph of an example showing two-step configuration of numerology blocks.

FIG. 5A shows an embodiment of a two-step configuration of numerology blocks. Time 501 is shown in the horizontal axis, and frequency 502 is shown in the vertical axis. A WTRU may receive a first control channel transmission, possibly using a group RNTI (or the like) in a first control region 503. A control region may be a set of resources where a control channel may be transmitted and may span one or more numerology blocks. A control channel transmission may indicate to a WTRU the boundaries of one or more numerology blocks spanning a portion or the entire carrier bandwidth; the control channel transmission may indicate the segmentation of at least a portion of the carrier bandwidth. Within the outer boundaries of the carrier 506a and 506c, there may be additional boundaries such as 506b. The control channel transmissions may be transmitted in a preconfigured frequency, bandwidth part (BWP), or numerology block using a known numerology; a BWP may be interchangeable with a numerology block(s). Such a control transmission may be periodic or aperiodic. Such a control channel transmission may also be used to configure the WTRU with the required parameters to decode at least one second control region that contains a second control channel transmission.

After decoding the boundaries 506a-c, a WTRU may expect a second control channel transmission indicating the set of parameters to be used in at least one of the numerology blocks in a second control region 504 and 505. The second control region 504 or 505 may span resources of a single numerology block and may be used to transmit control signaling related to that numerology block. The WTRU may expect such a control channel transmission to be in the same preconfigured frequency as the first control channel transmission, just as the second control regions 504 and 505 are shown to be within the first control region 503. In another case, the WTRU may expect a second control channel transmission to be transmitted within the frequency range encompassed by the numerology block(s) for which the configuration is applicable.

In an embodiment, the boundaries 506a-c of the numerology blocks may be indicated semi-statically (not shown); for example in a system information block. A WTRU may then monitor the different numerology blocks to receive control channel transmissions indicating the appropriate numerology parameters for at least one numerology block.

Figure 5B:
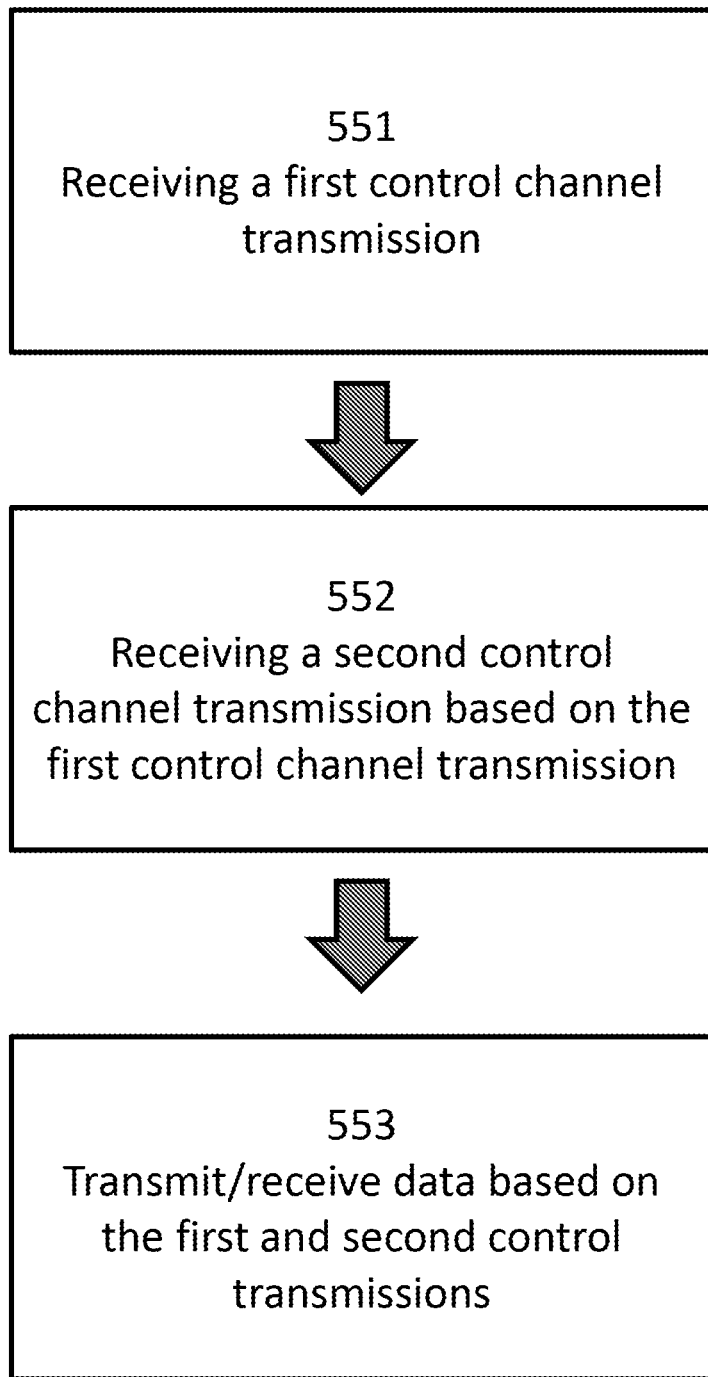
FIG. 5B is a flow chart of an example process according to an embodiment discussed herein.

FIG. 5B shows an example process following the example relating to FIG. 5A. At 551 a WTRU may receive a transmission on a first control channel, wherein the transmission includes first control information (i.e., first control channel transmission). At 552 the WTRU may receive a transmission on a second control channel, wherein the transmission includes second control channel information (i.e., the second control channel transmission). The second control channel may be known to the WTRU based on information provided in the first control channel transmission. At 553 the WTRU may transmit/receive data based on the first control channel transmission and/or the second control channel transmission. The first control channel transmission may configure the frequency boundaries for the second control channel transmission, and the second control channel transmission may have numerology configuration parameters for scheduling data transmission or reception of data.

In a method and system for flexible resource usage, a carrier's bandwidth may be segmented into numerology blocks, wherein there may be a protocol to address possible errors. The transmission of first, second, or both control channels may be periodic or aperiodic. If aperiodic transmission is used, a WTRU may assume no changes until it receives a new control channel transmission indicating a change in configuration. In one example, when aperiodic transmission is used there may be an error if a WTRU does not properly decode an indication of a change of boundaries of a set of parameters of at least one numerology block. Furthermore, when a first and second control channel are used to indicate the boundary(ies) and sets of parameters respectively, a missed first control channel may lead to an erroneously detected second control channel transmission.

To address this error possibility, a WTRU may transmit an acknowledgment upon receiving an aperiodic control channel for either a change in boundary(ies) or change in set(s) of parameters, or both.

Figure 5C:
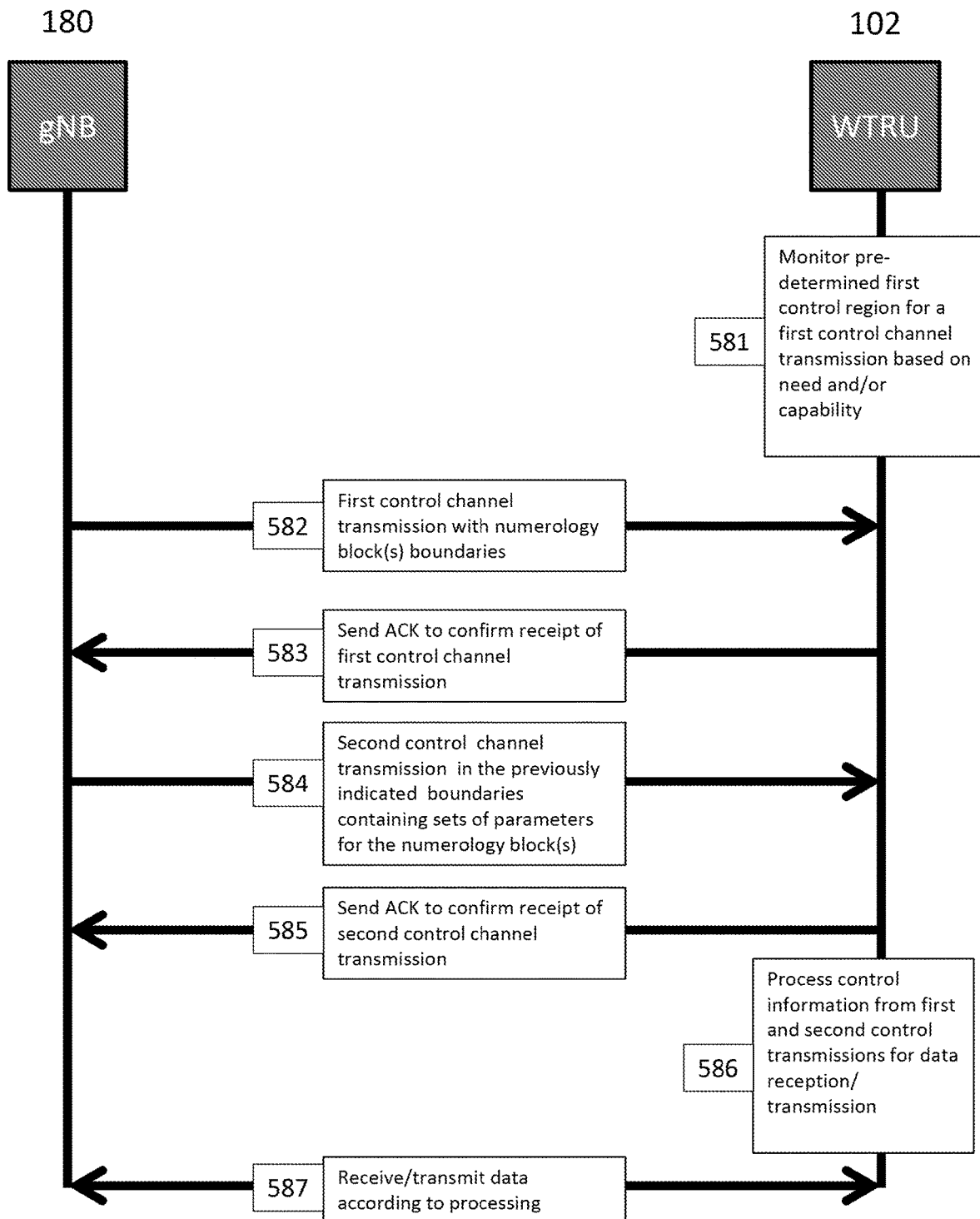
FIG. 5C is a flow diagram of an example process according to an embodiment discussed herein.

FIG. 5C shows an example process for dynamically receiving and changing numerology block(s) parameters/boundaries relating to the examples of FIG. 5A and FIG. 5B. In one embodiment, a WTRU 102 is preconfigured to monitor 581 periodically or aperiodically for a control channel in a first control region. A gNB 180 sends a first control channel transmission 582, such as a first DCI, to a WTRU 102 including numerology block(s) boundaries. In some instances, the WTRU 102 may be configured to send an acknowledgment (ACK) 583 to confirm the first control channel transmission 582. The gNB 180 may send a second control channel transmission 584 indicating parameters for the numerology block(s) of the first control channel transmission to the WTRU 102. In some instances, the WTRU 102 may be configured to send an acknowledgment (ACK) 585 to confirm the second control channel transmission 584. The WTRU 102 may use the information it received to process 586 the numerology configuration for transmitting/receiving data. The WTRU 102 may transmit 587 data to the gNB 180 according to the processing it performed based on the received numerology boundaries/parameters.

Alternatively, a change in boundary(ies) or sets of parameters of a numerology block may include a new value tag. Future scheduling assignments or grants may include the value tag as well. This may enable a WTRU to determine if a change in numerology blocks or parameters thereof has occurred since it last received a successful (re)configuration. In another alternative, the numerology block value tag may be transmitted in a periodic manner, either in a transmission of its own or tied to another (e.g., system information).

In a method and system for flexible resource usage a carrier's bandwidth may be segmented into numerology blocks, wherein there may be an indication of numerology blocks from the reception of a first signal. A WTRU may be configured to detect and decode synchronization signals (SS) (e.g., PSS, SSS) possibly with configurable numerologies and bandwidth. For example, a WTRU may attempt to blindly detect one or more SS with a subset of possible numerologies and bandwidths.

Upon detection of an applicable SS, the WTRU may determine the appropriate numerology and/or bandwidth used for at least one of: a subsequent system information transmission (e.g., a MIB or a SIB); a control channel transmission such as a control channel indicating numerology block segmentation and/or set of numerology parameters per numerology block; a paging transmission; and/or an uplink transmission (e.g., a PRACH transmission).

In one example if a WTRU detects an SS in a first set of resources, the WTRU may implicitly determine that system information will be transmitted in a second set of resources using a specific numerology (e.g., the same numerology as was used for the SS). In another example, upon detecting an SS in a first set of resources using a first numerology, the WTRU may attempt to detect system information or a control channel transmission in a subset of possible resources (e.g., a subset of possible frequency regions or subbands and/or time occasions) each using a possible subset of numerologies.

The subsets of resources and numerologies that a WTRU may attempt to blindly decode the system information may be determined implicitly from the SS transmission. For example, depending on the bandwidth and/or the sequence and/or the numerology of the SS transmission, the WTRU may be configured to attempt blind detection of system information on a specific set of resources and/or using a set of possible numerologies.

The system information resources (or the resources of any transmissions expected after the SS) may be defined relative to the resources of the SS. For example, an SS located at time n may indicate the possible presence of system information at time n+k, where the units of time for n and k may be pre-determined or may be dependent on a parameter of the SS (e.g. symbol duration of the SS). The relative relationship between an SS and a subsequent transmission (e.g., n and k) may be known a priori by the WTRU, either always fixed or configured by another cell, TRP, or carrier.

In an embodiment, at least one SS transmission may indicate explicitly the set of resources and/or numerology where a WTRU may attempt to decode system information. For example, this indication may be encoded as a parameter of the SS sequence or on top of the SS sequence. In another example, the SS may be composed of two parts, a sequence on a first set of resources and an indication of parameters used for system information in a second set of resources.

In an embodiment, multiple SS may indicate multiple numerology blocks. Also, a WTRU may detect multiple SS, possibly simultaneously. Each SS may be confined to a specific frequency range, and have a specific BW and may use a different numerology. The location, BW and/or numerology of each SS may enable the WTRU to determine numerology block boundaries and numerology block parameters. The parameters of each SS may enable the WTRU to detect and decode one or more system information transmissions, possibly using parameters indicated by the SS as discussed herein. In an example, each SS may indicate the parameters required for the WTRU to decode a unique system information transmission. Further, such a system information transmission may be applicable only to that numerology block. In another example, one or some or all SS may indicate parameters for the WTRU to decode general system information. Further, such a system information transmission may be applicable to all numerology blocks. In another example, each SS may point to any of a plurality of resources where system information may be transmitted. Depending on the resources where the WTRU obtains system information, the contents may include information relevant for all numerology blocks along with information which may be relevant only to a subset of numerology blocks (e.g. the block or blocks within which the system information is transmitted).

The WTRU may indicate to the network (e.g., in a first UL transmission) the set of SS it has detected and/or relevant measurements taken on the set of SS it has detected. For example, the WTRU may indicate channel quality indicator (CQI), reference signals received power (RSRP), received signal strength indicator (RSSI), or pathloss measurements taken on each SS it has detected. This may enable the WTRU to indicate its capabilities (e.g., in terms of bandwidth and numerology).

In a method and system for flexible resource usage, a carrier's bandwidth may support multiple flexible control channel regions, which may be configured accordingly. Control channels may operate with more flexible bandwidths in order to enable full flexibility of the size of numerology blocks. A control channel region may not span an entire carrier (e.g., in frequency or time). A control channel region may also be defined to be applicable for scheduling transmissions only for a subset of a subcarrier. For example, a control channel region transmitted on a subset of subcarriers may be applicable only for scheduling transmissions on that subset of subcarriers. In another example, a control channel region transmitted on a first subset of subcarriers may be applicable only for scheduling transmissions on a second subset of subcarriers where the second subset of subcarriers is a superset including the first subset of subcarriers.

In a method and system for flexible resource usage a carrier's bandwidth may support multiple flexible control channel regions, wherein there may be located one or more control channel regions per numerology block. A WTRU configured with multiple numerology blocks may assume at least one control channel regions per numerology block. A control channel region may include multiple search spaces. For example, the control channel region may span the entire numerology block (e.g., in frequency or time). Alternatively, the control region may span a subset of resources (e.g., frequency, time, beam, and/or spreading sequence) of the numerology block.

The control region may reuse the numerology parameters configured for the numerology block within which it is located. In an embodiment, the control region may use another set of numerology parameters. This set of numerology parameters specific to the control region may be indicated as part of the configuration of the numerology block. Alternatively, the control region set of numerology parameters may be included independently of the configuration of the numerology block, using methods described herein for the configuration of the set of parameters for a numerology block.

In a method and system for flexible resource usage a carrier's bandwidth may support multiple flexible control channel regions, wherein there may be located one or more control channel regions per set of numerology blocks. A WTRU may be configured to monitor at least one control channel region spanning multiple numerology blocks.

In an embodiment, the WTRU may monitor a control channel region for multiple numerology blocks if numerology blocks share the same parameters (e.g., same SCS, same cyclic prefix, same subframe length, etc.). The control region may span the entire set of numerology blocks (e.g., in frequency or time). In an embodiment, the control region may span the resources of a subset of numerology blocks. For example, a carrier may be segmented into two numerology blocks, and the control channel region may span all the subcarriers of a single numerology block. In an embodiment, the control region may span a subset of the combined resources (e.g., frequency, time, beam, and/or spreading sequence) of the multiple numerology blocks. For example, a control region may span one numerology block and may be applicable to multiple numerology blocks. The subset of combined resources may be adaptable and may be determined based on a previous transmission or transmissions (e.g., a previously transmitted control channel).

In an embodiment, numerology blocks may share a control region only when multiple numerology blocks are adjacent. Alternatively, non-contiguous numerology blocks may share a control channel region. For the case of non-contiguous numerology blocks sharing a control channel region, the control channel region may be included only in a subset of numerology blocks that are contiguous.

In an embodiment, the control channel region may span multiple non-contiguous numerology blocks. Non-contiguous numerology blocks may be considered to be contiguous in a virtual mapping. A virtual mapping may be used to effectively spread control channel elements (CCE) and/or resource element groups (REG), in a manner similar to where the multiple numerology blocks are contiguous. The virtual mapping of non-contiguous blocks may depend on at least one of: time of transmission for the symbol, subframe, or frame when the control channel is transmitted; frequency of the numerology blocks, where the mapping may depend on the set of numerology blocks for which the control channel is valid; beam or beam pair used to transmit the control channel; and/or previously used virtual mapper, and/or where the mapping rules may cycle through a predetermined set for each control channel transmission.

In an embodiment, a first control channel region applicable to a set of numerology blocks may be used to determine the resources used for the transmission of a set of second control channels. The set of second control channels may be applicable to a subset of numerology blocks. For example, a set of n numerology blocks may use a first control channel region located in resources designated for a numerology block i. The first control channel region may indicate the location of the set of second control channel regions each located in a different set of numerology blocks. For example, there may be a second control channel region in contiguous numerology blocks j and k and another second control channel region in non-contiguous numerology blocks 1 and m. This is similar to FIG. 5A, except that the purpose of the first control channel is to indicate the presence of the second control channels, whose purpose is to schedule in the appropriate numerology blocks.

In a method and system for flexible resource usage the behavior of the WTRU may be monitored based on ability or need: for example, when a WTRU does not or cannot support certain numerology blocks the WTRU may be able to save power by not monitoring those certain numerology blocks. A WTRU may monitor one or more control channel regions, which may be selected based on whether the control channel region is in a numerology block that the WTRU may be scheduled to transmit and/or receive data. This may be determined based on WTRU capabilities: for example, if a WTRU cannot use a specific set of numerology parameters, it may not monitor a control channel region that is applicable to a numerology block using that set of numerology parameters.

In an embodiment, the WTRU may monitor control channel regions depending on the type of service required. For example, a numerology block may be tied to a type of service and may only monitor control channels that may schedule transmissions on the numerology blocks for the services for which it is configured.

A WTRU may determine that some or all numerology blocks of a carrier are not applicable to the WTRU. In such a case, the WTRU may enter a low power mode/state (e.g., sleep or idle). In such a mode the WTRU may not monitor some or all of the control channels, at least on the numerology blocks that it may not or need not receive any control channel transmission. Further, in order for the WTRU to determine when to exit the sleep mode, the numerology block configuration may include a validity timer, wherein a transmission configuring one or more numerology blocks may indicate an amount of time (e.g. in time units, or in symbol units, or in subframe units) that a numerology block configuration is valid. A low overhead transmission may be used periodically to indicate the remaining time that a numerology block configuration is valid. This may enable a WTRU to determine (e.g., when the WTRU is woken up) whether it needs to monitor the one or more control channels or if it may re-enter sleep.

In a method and system for flexible resource usage the WTRU may perform monitoring based on scheduling relationship between numerology blocks: for example, a WTRU may be scheduled in multiple numerology blocks of a single control channel. A WTRU may monitor a control channel region based on pre-determined rules, such as a rule relating to the numerology block configuration.

In an embodiment, a WTRU may monitor a control channel region located in a numerology block with a specific numerology parameter (e.g. the largest SCS or equivalently, with the smallest symbol size). The WTRU may be configured with cross-numerology-block scheduling. In such an embodiment, when subframe boundaries between different numerology blocks do not coincide a control region in a first numerology block may be applicable only to numerology blocks with coinciding subframe boundaries. For example, a carrier may be segmented into two numerology blocks, a first numerology block with subframe duration half that of the second numerology block. A control channel transmission in the first numerology block may be applicable to schedule a WTRU only in the first subframe in the second numerology block.

In an embodiment, the control region in a first numerology block may be applicable to any other numerology blocks and for any subframes of the other numerology block until the next subframe boundary of the first numerology block where the control channel region is located. For example, a carrier may be segmented into two numerology blocks, a first numerology block with subframe duration half that of the second numerology block. A control channel transmission in the first numerology block may be applicable to schedule a WTRU in both concurrent subframes of the second numerology block.

In an embodiment, the WTRU may monitor control channel regions depending on the type of service required. For example, a numerology block may be tied to a type of service, and a WTRU may only monitor control channels that may schedule transmissions on the numerology blocks for the services for which it is configured.

In a method and system for flexible resource usage, the behavior of the WTRU may be monitored based on a configuration. In one embodiment, a WTRU may monitor a control channel region based on an indication by another transmission. For example, a WTRU may be configured to monitor a specific control channel region. The configuration may be semi-static (e.g., using system information or higher layer signaling) or it may be dynamic (e.g., using another control channel transmission located in a configurable control channel region).

In a method and system for flexible resource usage, the WTRU may perform monitoring based on a configuration, wherein the configuration may relate to monitoring control channels based on a hierarchy: for example, a WTRU may reduce its power consumption by regularly monitoring a smaller amount of control channel regions until instructed to monitor more. A WTRU may monitor a first level control channel to determine whether it needs to monitor or decode one or more second level control channels. The first level control channel may occur over a limited bandwidth or set of resources or set of numerology blocks, and the WTRU may only decode the first level control channel over the limited bandwidth or set of resources or numerology block(s). The WTRU, upon indication from the first level control channel that the second level control channel needs to be decoded, may perform decoding of the second level control channel potentially based on parameters provided in the first level control channel. The decoding of the second level control channel may be performed over a second sub-band or set of resources or set of numerology blocks (e.g., the entire bandwidth, set of resources, or set of numerology blocks). Further, this may involve turning on a larger, or different, portion of the front-end or digital processing of the WTRU receiver, waking up certain parts of the hardware required for processing the second level of the control channel, or other related actions. The WTRU may further determine its resource grants (UL/DL) for data, system information, or other data/information on the second control channel.

In one embodiment, WTRU may be configured in a low-power state when the scheduling activity at the WTRU is low, which may reduce the need to enable all of the WTRUs control channel processing during this low-power state.

In a method and system for flexible resource usage, a WTRU may receive information from the first control channel. Upon decoding the first level control channel, the WTRU may be able to determine some parameters of the second level control channel.

Required behavior, of the WTRU, following the decoding of the first control channel, may be a parameter of the second control channel determined by the WTRU upon decoding of the first control channel. Namely, the first channel may indicate whether the WTRU should monitor the second level control channel or not.

A parameter of the second control channel determined by the WTRU upon decoding of the first control channel may determine which control channels in the second level the WTRU should monitor. For example, what control channel region to monitor. In another example, the control channel regions may be associated with specific numerology blocks.

In one embodiment, the WTRU, upon decoding of the first channel, may perform decoding of the second control channel using the time-frequency resource location and bandwidth information provided in the first control channel to locate the control channel. The second channel may further use the first channel decoding method, C-RNTI, and numerology to perform the decoding, and it may further assume the location of the reference signals (RS) as provided in the first level control channel as the assumed location in the second level control channel. Parameters associated with the second control channel(s) include but are not limited to: timing and duration of the second control channel, in the form of an offset from the first control channel, an absolute time, or an offset from an absolute time; bandwidth, frequency resources, or numerology block(s), in the form of an absolute bandwidth or an index to a table providing allowable bandwidths; decoding method, such as, number of search spaces to decode, aggregation level of search spaces, DCIs or subset of DCIs, to search for; C-RNTI or other identifier used for decoding; numerology (subcarrier spacing, FFT size, etc) where the numerology of the second control channel may not match that of the numerology block within which it may be transmitted; process parameters used for the second control channel such as beam orientation, timing of the beam, Rx beamwidth, (e.g., one example, a WTRU may decode the first control channel using a wide Rx beam which may indicate the required beamwidth to use for the second control channel, and the WTRU may then decode the second control channel(s) using a narrower beam, or vice versa); and/or location of reference signals in the second level control channel.

A resource grant may be determined by the WTRU upon decoding the first control channel. In this case, the WTRU may ignore the decoding of the second level control channel.

The parameters of the second control channel may be explicitly indicated in the first control channel. In one alternative, the parameters of the second control channel may be determined by the WTRU via implicit methods, such as one or more parameters of the first control channel mapped directly to one or more parameters of the second control channel. For example, the numerology used for the first control channel may indicate to the WTRU the numerology used for the second control channel. In another alternative, one or more parameters described herein for decoding the second level control channel may not be provided in the first level control channel and known apriori by the WTRU, or may be provided to the WTRU using semi-static signaling, and the first level control channel may indicate only the need to decode the second level control channel.

In a method and system for flexible resource usage, a WTRU may receive an indication to monitor a second level control channel for a fixed period of time. A WTRU, upon receiving a message on the first level control channel, may be required to decode the second level control channel only for a fixed period of time. This period of time may be indicated in the message on the first control channel. The period may be in time, symbols, or subframes (e.g., using the symbol or subframe size of the second control channel or of the numerology block within which the second control channel is located). In another embodiment, the period of time may be known by the WTRU or semi-statically configured by the network. The WTRU may further not be required to monitor the first level control channel during this period. At the expiration of the period of time that the WTRU is required to monitor the second level control channel, the WTRU may go back to monitoring the first level control channel and stop monitoring the second level control channel until further signaling on the first level control channel.

In a method and system for flexible resource usage, there may be reference signals for control channels. A WTRU may use reference signals (RS) for channel estimation to enable the demodulation of control channel transmissions. In one embodiment, the RSs may be concatenated within a CCE in a similar fashion as REGs. The RSs may then be interleaved in a similar manner as REGs, in order to ensure the appropriate spreading of RSs within the resources used for a control channel region.

In another embodiment, the RSs may be configured or placed in a manner dependent on the set of numerology parameters used within a numerology block. Such placement may be fixed or may be configurable, at the same or different time as the configuration of a numerology block.

The RSs may be mapped to one or more numerology blocks. For example, the RSs may be present in all numerology blocks and in all subframes. In another example, the RSs may be present in all numerology blocks but only in subframes with scheduling opportunities. In another example, the RSs may be present only in numerology blocks and/or subframes where a control channel region has been configured.

In a method and system for flexible resource usage, a WTRU may transmit or receive data on multiple numerology blocks. A WTRU may be configured to transmit (or receive) signals according to more than one numerology at a given time, in the same or different carrier. This type of operation may be beneficial to support multiple use cases for a WTRU and/or may enable a WTRU to access the full frequency resources of a carrier configured with multiple numerology blocks.

Figure 6A:
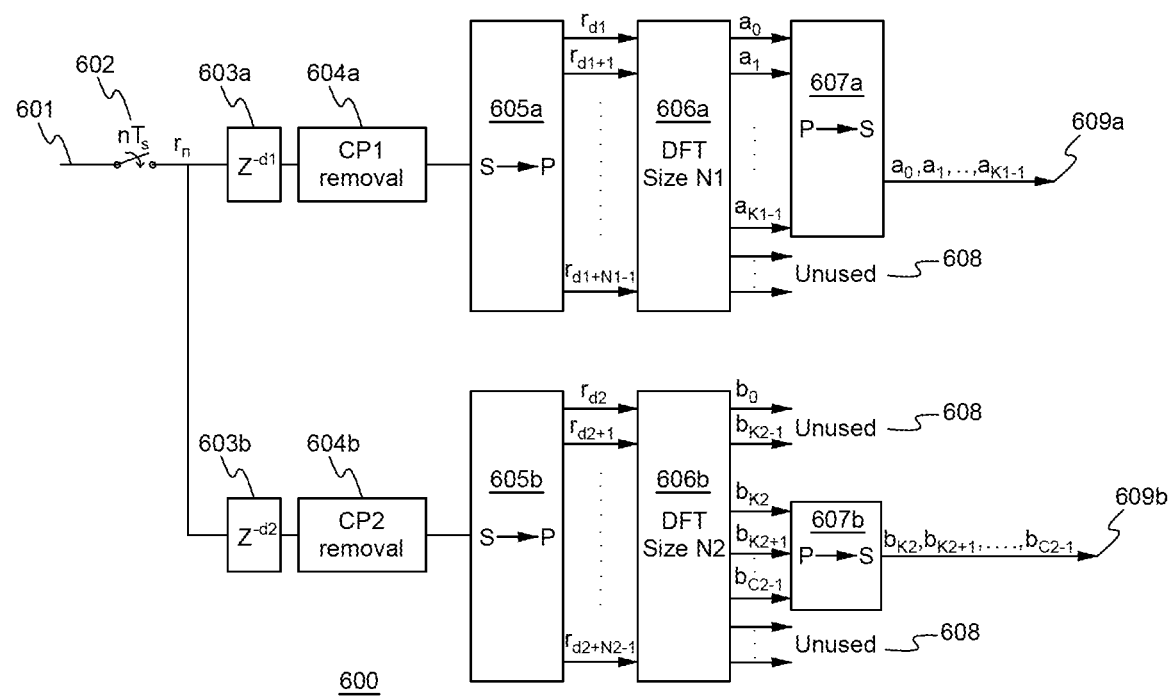
FIG. 6A is a diagram of an example system for receiving signals according to one or more numerologies.

FIG. 6A illustrates an example embodiment for the reception of signals according to more than one numerology. The received signal 601 may be composed of signals structured according to more than one numerology in different frequency blocks. For example, the sub-carrier spacing of a first and second signal components may be $S_1$ and $S_2$, respectively. The first signal component may occupy a frequency block of bandwidth $W_1 = K_1 \times S_1$ at the upper frequency range of the carrier, where $K_1$ is the number of sub-carriers used by the first signal component. The second signal component may occupy a frequency block of bandwidth $W_2 = (C_2 - K_2) \times S_2$ at the lower frequency range of the carrier, where K2 is the number of sub-carriers used by the second signal component and $C_2$ is the carrier bandwidth expressed in units of $S_2$. The first and second signal components may occupy non-overlapping frequencies.

After sampling at rate Ts at 602, the samples $r_n$ may be processed by parallel chains. The parallel chains start with elements $Z^{-d1}$ 603a and $Z^{-d2}$ 603b that may add delays (e.g., d1 or d2) in an example where the symbols of different numerology do not start at the same time; in other examples the delays may not be used. In each chain a cyclic prefix (CP) (if applicable) may be removed prior to DFT processing at CP1 604a and CP2 604b, where CP1 and CP2 are the respective cyclic durations. CP may be removed such that the DFT operation occurs every (N1×Ts+CP1) and every (N2×Ts+CP2) for the first and second chain respectively. At 605a and 605b serial to parallel processing may occur to enable inputting the time samples as a group into the DFT. Each chain may execute a DFT operation with different sizes and different rates at DFT 606a for the first chain and DFT 606b for the second chain. The DFT sizes of the first and second chain are: N1=1/(Ts×$S_1$) and N2=1/(Ts×$S_2$) respectively. Following DFT processing, samples 608 that do not correspond to sub-carriers where a signal was present according to the corresponding numerology may be discarded. The samples that do correspond to a subcarrier where a signal was present according to the corresponding numerology may go through parallel to serial processing 607a and 607b where the DFT produces a group of elements that may then be placed in a serial manner to enable further processing of the data 609a and 609b for their ultimate destination.

Figure 6B:
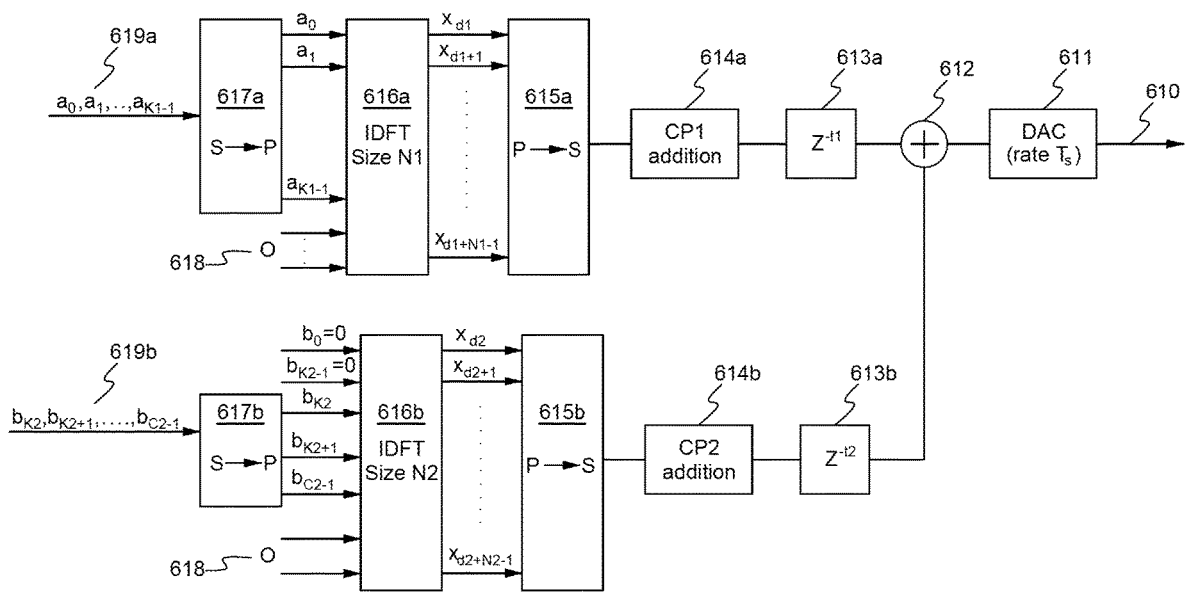
FIG. 6B is a diagram of an example system for transmitting signals according to one or more numerologies.

FIG. 6B shows an example embodiment for the transmission of signals according to more than one numerology. Similarly to the reception example, the transmitted signal may be composed of signals structured according to more than one numerology in different frequency blocks. The processing steps correspond to the processing steps at the receiving side, in reverse order. There may be data 619a and 619b from a source that is processed in parallel chains. The data may undergo serial to parallel processing at 617a and 617b. For each numerology, an inverse DFT (IDFT) 616a and 616b operation may be performed on signals corresponding to each sub-carrier, and values zero (0) 618 may be inserted for sub-carrier positions for which the signal of the corresponding numerology is not present. The signals then undergo parallel to serial processing at 615a and 615b. Following insertion of cyclic prefix at 614a and 614b the samples from each chain may process a delay at elements $Z^{-t1}$ 613a and $Z^{-t2}$ 613b (i.e., similar to 603a and 603b discussed herein). At 612 the samples are summed prior to digital-to-analog conversion at 611, at which point they may be transmitted at 610.

The order of operations shown in FIGS. 6A and 6B are examples and may be reordered, removed, or added to as necessary. For example, windowing (i.e. multiplication of samples by a time-varying factor) may be processed prior to CP removal to enhance spectral isolation between signals during the receiving operation. In another example, windowing may also be processed at the transmitter side prior to summation.

A WTRU may be scheduled to receive or transmit data on resources within a numerology block. The control channel scheduling resources for transmission may be in the same numerology block as the data transmissions or in another numerology block.

A WTRU may be scheduled with transmissions spanning multiple numerology blocks with a single control channel transmissions. In one embodiment, the WTRU may receive or transmit at least one transport block (TB) per numerology block. In this embodiment, a WTRU may be scheduled with multiple transport blocks to enable transmission or reception of data on the entire carrier bandwidth.

A WTRU may receive or transmit at least one transport block per set of numerology blocks. For example, a transport block may span multiple numerology blocks if they share the same sets of numerology parameters. A transport block may span multiple contiguous or non-contiguous numerology blocks. The RE mapping of the transport block spanning multiple non-contiguous numerology blocks may be done in a virtual manner before transposing it to the actual physical resources.

A WTRU may receive or transmit at least one transport spanning multiple numerology blocks. For example, a transport block may span multiple numerology blocks regardless of whether a set of numerology parameters are the same for each numerology block. In a specific example, a system has a carrier support a first service (e.g., eMBB) with a first numerology block and a second service (e.g., URLLC) with a second numerology having different numerology parameters; in this case, the carrier may reconfigure at least one numerology block to harmonize the parameters before scheduling a WTRU. Alternatively, the numerology parameters may be maintained differently for different blocks. In one embodiment, better inter-cell interference coordination may be enabled by the WTRU receiving or transmitting at least one transport spanning multiple blocks.

In a method and system for flexible resource usage, there may be control information relating to frequency allocation for WTRU data transmission. Data transmissions may be scheduled by control channels located in at least one numerology block. The control information for data transmitted on one or more numerology blocks may include a frequency allocation. The frequency allocation may indicate the actual set of subcarriers in which the data may be transmitted or received by the WTRU. The subcarriers may be numbered in a sequential manner depending on the numerology block configuration. For example, if a first numerology block has an SCS that leads to having n subcarriers, its subcarriers may be labeled 0 to n. The second numerology block (where numerology blocks are numbered from lowest frequency to highest) may have m subcarriers, and its subcarriers may be labeled n+1 to n+m−1, and so on. In another example, the subcarriers may be labeled in a manner that is independent of the number of subcarriers in other numerology blocks. For example, the n subcarriers of numerology block N may be labeled N.i where 0≤i<n. The above may also be applicable to the case where resource blocks are used instead of subcarriers in the allocation.

In another embodiment, the frequency allocation may indicate a set of frequencies (or a frequency range) over which the data may be transmitted or received by the WTRU. Based on the set of frequencies and the numerology block configuration, the WTRU may determine the total number of resource elements (RE).

In another embodiment, a frequency allocation may be expressed in terms of a set of numerology-independent resource blocks, where a resource block may be defined in terms of a fixed bandwidth independent of the subcarrier spacing. Thus the number of subcarriers in a resource block defined in this manner depends on the subcarrier spacing. For example, a resource block of 180 kHz may be defined as 12 sub-carriers or 6 sub-carriers depending on whether the sub-carrier spacing is 15 kHz or 30 kHz, respectively. Such an embodiment may enable the indication of a frequency allocation independent of the subcarrier spacing used in each numerology block.

In a method and system for flexible resource usage, there may be control information relating to frequency allocation for WTRU data transmission, where the data channel reception/transmission is adaptable. A WTRU may be configured with a subset (of the entire carrier) of frequency resources on which it may transmit or receive data. Such a configuration may be required to enable efficient frequency allocation. For example, a WTRU may be configured with a subset of numerology blocks or with a subset of resources within a numerology block.

In one embodiment, a WTRU may be configured with an operating bandwidth B1 on carrier C (whose overall bandwidth is B>B1). At some time, the WTRU may be reconfigured by the network to change its operating bandwidth from B1 to B2 (B1<B2<B) to enable the WTRU to be scheduled with a larger amount of resources. In another example, a WTRU may be configured to operate with a first subset of numerology blocks and at some time may be configured to change to a second subset of numerology blocks: such reconfiguration may comprise the addition of resource blocks, subcarriers, or numerology blocks to the overall bandwidth which the WTRU may schedule for data or may utilize for UL transmission.

A WTRU configured with a smaller bandwidth may configure its reception, data processing, measurements, etc. such that it is limited to that segment. A WTRU may use a front-end, FFT/IFFT, or baseband processing that is limited to the segment that was configured by the network. For example, a WTRU configured with bandwidth B1 may utilize FFT size F1 to receive the data channel. When configured with bandwidth B2>B1, the WTRU may utilize FFT size F2>F1 to receive the data channel. Such configuration may result in power savings advantages when the WTRU's load requirements are not sufficient to warrant that its receiving circuitry/HW/SW operates over the entire bandwidth of a given carrier.

Bandwidths or segments (including resource blocks and their configurations) may be predefined by standardization, or based on system information broadcast by the cell. A WTRU may receive a set of indices, each corresponding to one of the segments or numerology blocks that may be utilized as the configured WTRU-specific bandwidth for a given time.

Adaptable data bandwidth may enable the frequency allocation in a scheduling assignment or grant to have greater granularity without requiring larger payload. In these examples, the interpretation by the WTRU of the frequency allocation included in control information for scheduling may be dependent on the configured frequency resources. For example, if a WTRU is configured with a first set of frequency resources, the frequency allocation in a scheduling assignment or grant may indicate granularity on the level of subcarriers or groups of subcarriers. Alternatively, if a WTRU is configured with a second larger set of frequency resources, with multiple numerology blocks for example, the frequency allocation in a scheduling assignment or grant may indicate a granularity of resource blocks or groups of resource blocks.

A WTRU may perform scaling of resource-related information in the DCI message based on the configured data channel bandwidth. Such scaling may enable the same type of DCI messages to be utilized, regardless of the adaptive data channel bandwidth currently configured for the WTRU, while still allowing the scheduler to address all resources with sufficient granularity. The WTRU may apply scaling on the following quantities within the DCI: resource block index (e.g. starting index for a resource allocation); length or number of resource blocks; and/or bitmap of allocated resource blocks.

For example, a WTRU may interpret the length field in a DCI message allocating a number of contiguous resource blocks depending on the configured data bandwidth. A WTRU may receive a length N for the resource allocation while having B1, and decode data on N resource blocks. When configured with bandwidth B2>B1, the WTRU may decode x*N resource blocks (where x>1).

The WTRU may be reconfigured to change the bandwidth and/or location of the activated data channel on the carrier by the network.

A WTRU may change the adaptable data channel bandwidth in order to save power. Changes in the adaptable data channel may be based on semi-static bandwidth change signaling, dynamic signaling of data bandwidth, periodic determination of bandwidth, and/or automatic fallback to lower bandwidth, all of which are discussed herein.

For semi-static bandwidth change signaling, a WTRU may receive a message from the network (RRC signaling, medium access control (MAC) CE, or physical layer (PHY)) to indicate a change in the configured data channel bandwidth. For example, the WTRU may be configured to increase/decrease the data bandwidth using such signaling, possibly as a result of the introduction/removal of a service and/or the determination by the network of the need for a larger/smaller amount of resources.

For dynamic signaling of data bandwidth, the data bandwidth to be utilized may be signaled through the presence/absence and/or positioning of reference signals. A WTRU may detect a change in the configured bandwidth based on a change in the positioning of reference signals. For instance, a change in the positioning of reference signals over B1 may indicate to the WTRU that the configured bandwidth has changed to B2.

For periodic determination of bandwidth a WTRU may be required to periodically determine the data channel bandwidth used for a period of time by reading of system information from the network or by periodically transmitted group-specific (re)configuration. The WTRU may operate on the cell bandwidth or set of numerology blocks broadcast by the cell for a specific period of time until the next expected broadcast of the cell bandwidth or set of numerology blocks by the network.

Where automatic fallback to lower bandwidth occurs a WTRU, following use of a larger bandwidth (B2>B1), may automatically fall back to using a lower bandwidth (B1). Such fallback may occur potentially under at least one of the following conditions: following a specific amount of time without having received a message from the network to increase, change, or maintain the larger bandwidth; upon the detection of the absence of reference signals in the additional portions of the segment or bandwidth associated with the extension (i.e. B2−B1) where such absence may be determined by the WTRU if the reference signal power associated with the extension is below a configured threshold; and/or following a specific amount of time without having received any scheduling from the network (DL or UL) or following a period of time where the number of grants received by the network is below a configured threshold.

Upon falling back to a lower operating bandwidth (or to a fallback set of numerology blocks), the WTRU may begin monitoring a fallback control channel region. Such a fallback control channel region may be the regular control channel region associated with the set of numerology blocks intended for fallback operation. Such a fallback control channel region may be a first control channel as explained in the hierarchical control channel embodiment presented herein. In another embodiment, the WTRU may fall back to monitoring the control channel region that may be used to reconfigure the numerology blocks.

A WTRU may change its data channel bandwidth within a single TTI, such that the configured data bandwidth for the WTRU, and correspondingly the FFT/baseband processing performed by the WTRU, may differ for one set of symbols in a TTI compared to a different set of symbols for the same TTI. For instance, a WTRU operating with a configured data bandwidth B2>B1 may assume that for the first x symbols, the WTRU operates using data bandwidth B1, while for the remaining symbols of the TTI, the WTRU operates using data bandwidth B2.

A WTRU may further operate using adaptation within a TTI depending on its variable data channel configuration. For example, a WTRU may assume that for certain configurations (e.g. WTRU is configured with bandwidth B1), the WTRU may always employ bandwidth B1, while for other configurations (e.g. WTRU is configured with bandwidth B2>B1) the WTRU may employ bandwidth B1 for the beginning of the TTI and bandwidth B2 for the end of the TTI.

A WTRU may be scheduled with a variable or adaptive data channel by having the WTRU receive data over a first set of resource blocks in an initial assignment, and have additional or extension resources provided to the WTRU either simultaneously or with a predefined offset. A WTRU may then receive supplemental control information relating to its resource assignment within one of the resource blocks or set of resource elements or set of numerology blocks assigned to it for data. The supplemental control information may provide the resources (e.g., resource blocks) or usage of the resources (e.g., modulation and coding schemes (MCS)) to be used by the WTRU in the extension resources. The WTRU may expect the supplemental control information to be present under certain data channel configurations or bandwidths and it may be determined in: an encoded control frame located in a defined or semi-statically configured set of resources within the initial assignment to the WTRU; and/or a MAC CE transmitted in the resources within the initial assignment to the WTRU.

In one example embodiment, a WTRU may be configured to operate using a data channel which may be 5 MHz, 10 MHz, or 20 MHz. Operation under 10 MHz or 20 MHz may be considered operation under extension resources. When operating with a data channel of 20 MHz, the WTRU may receive a resource grant which indicates the specific resource blocks allocated within the initial 5 MHz bandwidth. The WTRU, operating using extension resources, may determine the additional resources allocated to it in the extension band by decoding a WTRU dedicated control message located within the WTRU dedicated resources assigned over the initial 5 MHz. The WTRU may further assume a time offset between the base 5 MHz, and the extension (additional 15 MHz) data resources to allow decoding of the supplemental control information, or it may assume data channel adaptation can occur within a TTI, as defined earlier.

Data may be mapped to REs in virtual resource blocks (VRBs), and to possibly combat frequency selectivity, wherein such VRBs may be mapped to non-adjacent PRBs. The mapping of VRB-to-PRB may be indicated in a DCI scheduling the transmission, possibly using a bitmap for all PRBs or an input to a pre-configured mapping function. In some cases, a WTRU or a TRP may not transmit on a set of numerology blocks deemed blanked or unused resources. The VRB-to-PRB mapping may depend on what blocks may be used for transmission. In one scenario, the VRB-to-PRB mapping may be explicitly indicated to a WTRU in a control channel transmission (e.g. in a DCI). In another scenario, the VRB-to-PRB mapping may be achieved by a block based interleaver and/or a splitting of resource block pairs by a certain frequency gap. For the case of block based interleaver, the interleaving function may be done only on PRBs of numerology blocks for which a WTRU is configured to operate on. For example, the PRBs configured to a WTRU may be consecutively indexed, and such indexing may skip over bandwidth portions of a carrier that are not configured for the WTRU (e.g. blanked or unused resources). For the case of resource block pair splitting, the gap may be counted only on PRBs of numerology blocks for which a WTRU is configured to operate on, in a similar manner as described above for interleaving.

In some cases, the VRB-to-PRB mapping may be defined in such a way that is independent of whether one or more frequency regions is unused. For example: the VRB-to-PRB mapping may take into account unused numerology blocks; the interleaving may always ensure that no VRB is mapped to a PRB of a numerology block that should not be used; and/or the total bandwidth may be split into PRBs, and such PRBs may be indexed in some order (e.g. from lowest frequency to highest). The WTRU may understand the VRB to PRB mapping rules to take into account all PRBs including those in regions where it may not expect data transmissions (e.g. regions where it has not been configured a numerology block). In such a case, the WTRU may need to know the numerology of the unused numerology blocks, possibly to determine the appropriate number of unused PRBs in the unused numerology block (i.e. if PRB size is dependent on the numerology, such as if it is a fixed number of subcarrier). A WTRU may be configured with numerology parameters for unused numerology blocks. Such configuration may indicate to a WTRU the numerology parameters to assume for a block, possibly along with an indication that such a block may not be used for data transmission in UL, DL, or SL.

Figure 7:
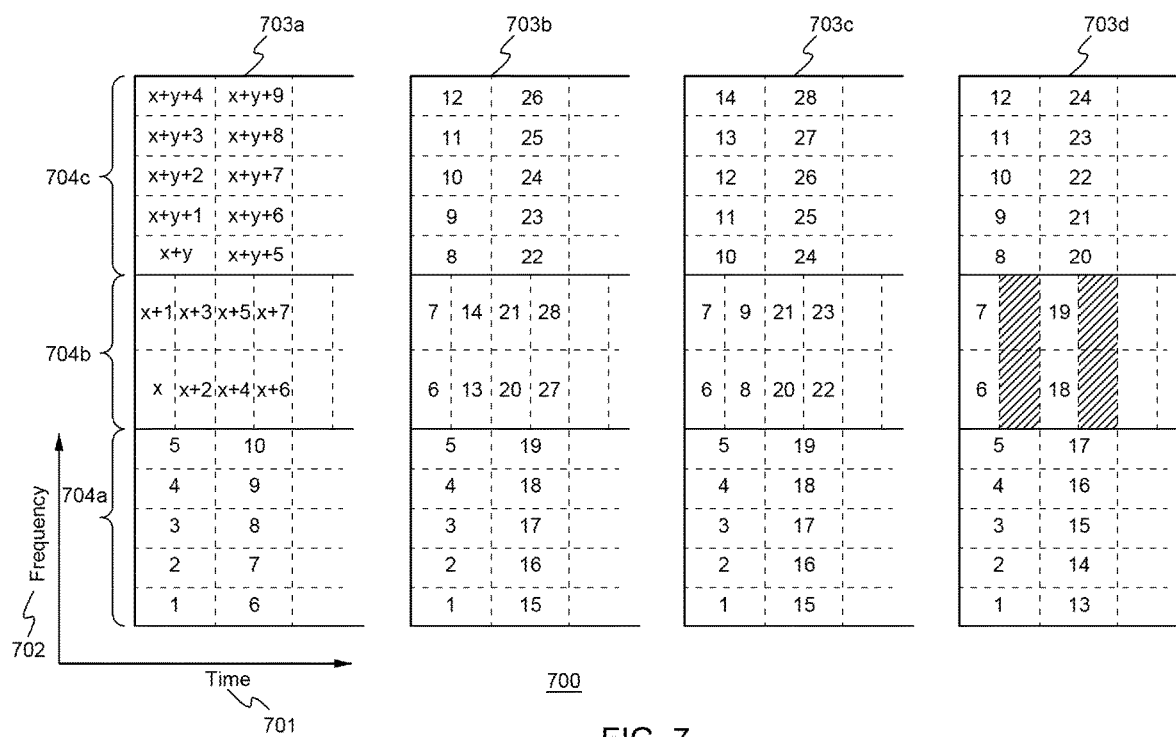
FIG. 7 is a graph showing an example of mapping over multiple numerologies.

In a method and system for flexible resource usage, data may be mapped to resource elements of multiple numerology blocks, each with different numerology parameters. FIG. 7 shows an example of RE mapping over multiple numerology blocks using frequency 702 first then time 701: mapping per numerology block 703a; incrementing by smallest symbol time 703b; incrementing by symbol time of each numerology block 703c; and/or incrementing by largest symbol time 703c. The groupings 704a, 704b, and 704c represent example frequency ranges.

A transport block may be transmitted on a single numerology block or multiple numerology blocks, the resource element (RE) mapping may be done in frequency (i.e. over the subcarriers) first and then in time (i.e. over the symbols); or vice-versa.

Alternatively, a transport block may span multiple numerology blocks, with different sets of numerology parameters, where the RE mapping may be pre-determined, indicated in the control information scheduling the transmission, or indicated in a configuration of the numerology blocks.

In an embodiment the RE mapping may be done per numerology block; whereby the mapping is done within a numerology block following mapping rules discussed for a single numerology block. The order of the numerology blocks for the RE mapping may be done sequentially over frequency or time.

In an embodiment relating to the example of FIG. 7 part 703b, the RE mapping may be done over all the numerology blocks. For example, the RE mapping may be done over the subcarriers first. The symbol boundary of the smallest symbol may be used and the mapping may begin at the first symbol boundary over all subcarriers that have a boundary at that time. Next, the mapping may continue to the second smallest symbol boundary, and it may be done over all subcarriers that have a boundary at that time. A similar embodiment may use time first and the subcarrier boundaries of the smallest subcarrier.

In an embodiment relating to the example of FIG. 7 part 703c, the RE mapping may be done over all the numerology blocks in frequency (or time) first and then in time (or frequency). In this example, the time is incremented by largest symbol size. For numerology blocks with smaller symbol time, the RE mapping is done over that numerology block's frequency range and shifted in time until the end of the larger symbol time.

In an embodiment relating to the example of FIG. 7 part 703d, the RE mapping may be done in frequency first but using time boundaries defined by a symbol size other than the smallest. The appropriate symbol size boundary may be indicated in the control information or may depend on a parameter of the control channel used to transmit the control information (e.g. the control channel region, or the numerology of the control channel region). In this example, some REs in some numerologies may remain unused.

In the time domain, the data may be mapped to non-adjacent symbols. For example, RE mapping may use time interleaving, possibly to randomize the effect of per-symbol interference changes. In another example, the data mapping may skip over some symbols. For example, the RE mapping may be done over all subcarriers of a first set of symbols, then skip over a second set of symbols and continue over a third set of symbols. Such an interruption need not signal the transmission of different transport blocks. The interruption timing and size may be indicated in a control channel transmission providing scheduling information.

In a method and system for flexible resource usage, the numerology used for a WTRU transmission may be selected by the WTRU. For example, a WTRU may be configured with a set of numerology blocks with specific sets of numerology parameters. However, the WTRU may have a need for a grant-free transmission that uses a different set of numerology parameters. In another example, the WTRU may be configured with appropriate numerology blocks, however, it may require a larger bandwidth using that numerology for its transmission.

The WTRU selected sets of numerology parameters may depend on a pre-configuration where the network indicates to the WTRU what sets of numerology parameters are applicable. This configuration may be done jointly with the numerology block configuration.

In another embodiment, a WTRU may follow some pre-determined rules for applicable WTRU selected sets of numerology parameters. For example, the WTRU may only select numerology parameters that scale in a way with the numerology in the colliding numerology blocks. For example, the WTRU may only select numerologies whose symbol duration or subcarrier spacing are integer multiples (or divisors) of the symbol duration or subcarrier spacing of the colliding numerology block. In yet another embodiment, only parameters that won't create new inter-/intra-numerology block interference may be altered. For example, a WTRU may select a different subframe length but should maintain subcarrier orthogonality by not changing subcarrier spacing.

In a method and system for flexible resource usage, resource elements are mapped with reference signals to address when transmissions with different numerologies (to or from different TRPs) may collide. Different TRPs or WTRUs may be configured with different numerology block configurations for a carrier. For example, a first TRP may have a first set of numerology block boundaries and numerology block sets of parameters, and a second TRP may have a second set of numerology block boundaries and numerology block sets of parameters. It may be desirable for RSs using different sets of numerology parameters on the same subbands of a carrier to have dependent characteristics. For example, for proper interference management, orthogonal cover coding (OCC) may be used when RSs overlap in time and frequency. In another example, it may be beneficial for a WTRU to be able to measure RSs from different TRPs not using the same numerology parameters in a subband. However, these two cases may be difficult to achieve if the RSs don't share the same numerology parameters.

Figure 8:
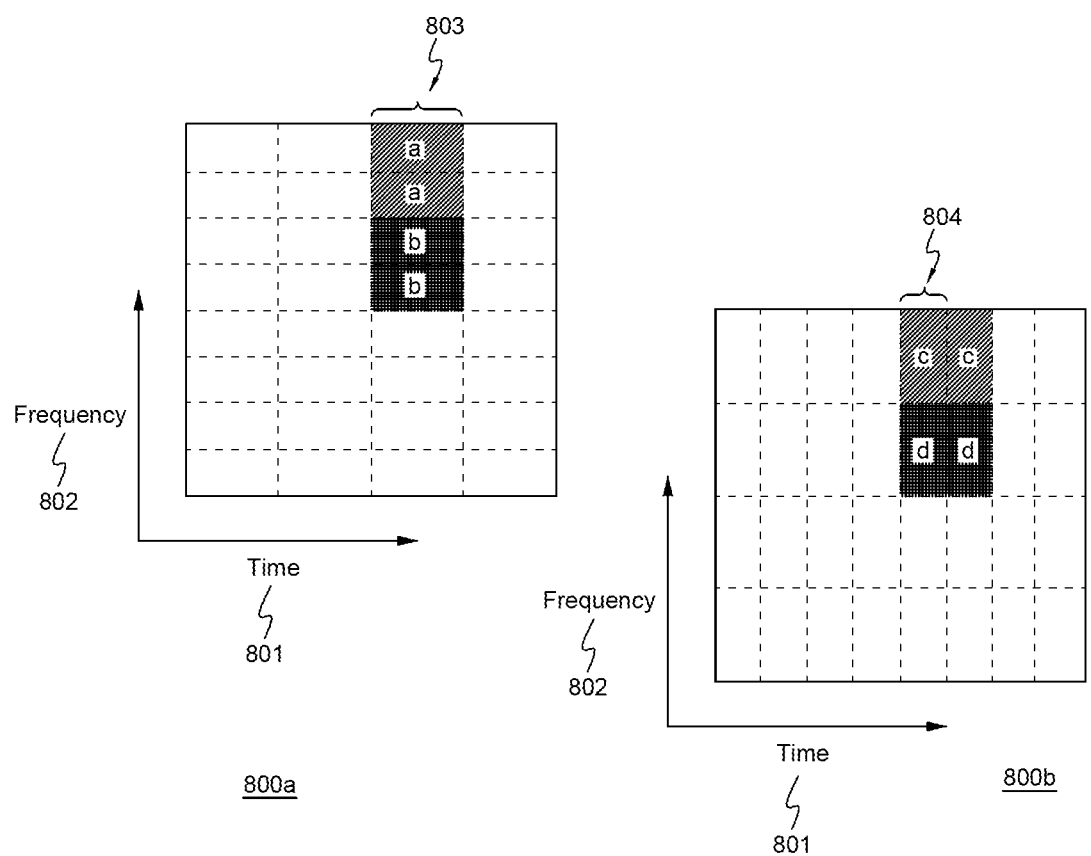
FIG. 8 is a graph showing an example of repetition of RS in time or frequency for orthogonalization of RS from different TRPs.

FIG. 8 shows an example of the reception of an RS in time or frequency for orthogonalization of RS from different TRPs. The time or symbol length is indicated in the horizontal axis 801, and the frequency is indicated in the vertical axis 802. RS mapping may be done in a manner to make different numerologies have similar RS overhead. For example, there may be a first RS 800a transmission from a first TRP (or intended for a first TRP) on a portion of a carrier using a first symbol length 803, along with a second RS 800b transmission from a second TRP (or intended for a second TRP) on the same portion of the carrier using a second symbol length 804. Assuming the first symbol length 803 is an integer divisible into the second symbol length 804, then an RS transmitted (or received) using the first symbol length should be repeated in time to match the second symbol length. For example, "a" having a first symbol length 803 may overlap in time with two "c" having a second symbol length 804 which is half the length of the first symbol length 803. A similar embodiment may be used for integer scalable subcarrier size using repetition in frequency. A combination of time and frequency repetition may be used; for example, an RS transmitted using the first numerology of 800b (with small symbol time and large SCS) may use repetition in time while an RS transmitted using the second numerology 800a (with large symbol time and small SCS) may use repetition in frequency.

In another embodiment, all RSs in colliding subbands (e.g. from different TRPs or WTRUs) may use the same set of numerology parameters. In this case, the RS numerology configuration may be independent of the numerology block configuration. For example, the RS transmission may occupy a block of time frequency resources. The modulation may be done using IFFT with subcarrier spacing matching the smallest subcarrier spacing between the colliding numerology blocks. Furthermore, the sampling may be done assuming the smallest symbol time between the colliding numerology blocks.

In another embodiment, blanking may be used to ensure orthogonality between RSs of different numerologies using the same time-frequency resources. For example, an RS transmitted using a first numerology with small subcarrier spacing may require that transmissions using a second numerology with larger subcarrier spacing blank multiple symbols for the colliding subcarrier(s). Similarly, an RS transmitted using a first numerology with large subcarrier spacing may require that transmissions using a second numerology with smaller subcarrier spacing blank multiple subcarriers for the colliding symbol(s).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed:

1. A method for a wireless transmit/receive unit (WTRU), the method comprising:
    receiving a transmission including at least a synchronization signal, the received transmission having a first subcarrier spacing;
    determining a second subcarrier spacing based on the received transmission;
    receiving initial access parameters using the determined second subcarrier spacing; and
    performing initial access using the initial access parameters.

2. The method of claim 1, wherein the initial access parameters include a third subcarrier spacing for use in performing initial access.

3. The method of claim 1, wherein performing the initial access includes sending a signal on a physical random access channel.

4. The method of claim 1, wherein the synchronization signal includes a primary synchronization signal and a secondary synchronization signal.

5. The method of claim 1, wherein blind detection is used to detect the synchronization signal using a set of resources.

6. The method of claim 1, wherein the first and second subcarrier spacings is out of a set of subcarrier spacings.

7. A wireless transmit/receive unit (WTRU) comprising:
    a transceiver coupled to a processor, the transceiver configured to receive a transmission including at least a synchronization signal, the received transmission having a first subcarrier spacing;
    the processor configured to determine a second subcarrier spacing based on the received transmission;
    the transceiver configured to receive initial access parameters using the determined second subcarrier spacing; and
    the transceiver and processor further configured to perform initial access using the initial access parameters.

8. The WTRU of claim 7 wherein the initial access parameters include a third subcarrier spacing for use in performing the initial access.

9. The WTRU of claim 7, wherein performing the initial access includes sending a signal on a physical random access channel.

10. The WTRU of claim 7, wherein the synchronization signal includes a primary synchronization signal and a secondary synchronization signal.

11. The WTRU of claim 7, wherein the receiver and the processor use blind detection to detect the synchronization signal using a set of resources.

12. The WTRU of claim 7, wherein the first and second subcarrier spacings are out of a set of subcarrier spacings.

* * * * *